US009934646B2

(12) United States Patent
Igesund

(10) Patent No.: US 9,934,646 B2
(45) Date of Patent: Apr. 3, 2018

(54) GAMING MACHINE WITH REARRANGEMENT OF WILD SYMBOLS

(71) Applicant: Pridefield Limited, Douglas, Isle of Man (GB)

(72) Inventor: Terence Igesund, Kaw-Zulu Natal (ZA)

(73) Assignee: Pridefield Limited, Douglas, Isle of Man (GB)

( * ) Notice: Subject to any disclaimer, the term of this patent is extended or adjusted under 35 U.S.C. 154(b) by 142 days.

(21) Appl. No.: 15/141,010

(22) Filed: Apr. 28, 2016

(65) Prior Publication Data

US 2016/0351006 A1 Dec. 1, 2016

(30) Foreign Application Priority Data

May 29, 2015 (GB) .................................. 1509339.6

(51) Int. Cl.
*A63F 13/00* (2014.01)
*G07F 17/32* (2006.01)
*G07F 17/34* (2006.01)

(52) U.S. Cl.
CPC .......... *G07F 17/3213* (2013.01); *G07F 17/32* (2013.01); *G07F 17/34* (2013.01)

(58) Field of Classification Search
CPC . G07F 17/326; G07F 17/3262; G07F 17/3265
See application file for complete search history.

(56) References Cited

U.S. PATENT DOCUMENTS

| | | | |
|---|---|---|---|
| 5,704,835 | A | 1/1998 | Dietz, II |
| 6,379,248 | B1 | 4/2002 | Jorasch et al. |
| 6,712,697 | B2 | 3/2004 | Acres |

(Continued)

FOREIGN PATENT DOCUMENTS

| | | |
|---|---|---|
| AU | 2003246319 | 10/2003 |
| AU | 2013251288 | 5/2014 |

(Continued)

OTHER PUBLICATIONS

Australian Government, IP Australia, Examination Report No. 1 dated Mar. 28, 2017, issued in connection with Australian Patent Application No. 2016202966, 2 pages.

(Continued)

*Primary Examiner* — James S McClellan
(74) *Attorney, Agent, or Firm* — McDonnell Boehnen Hulbert & Berghoff LLP

(57) ABSTRACT

A gaming machine may determine that a trigger event for a bonus game occurred during a base outcome event of a base game. The base game and the bonus game may both be reel-based games being executed on behalf of a client machine. The symbols on each reel may include at least two unstacked wild symbols. In response to determining that the trigger event occurred, an instance of the bonus game may be awarded. A special symbol may be included on each reel for the bonus game. Until all of the reels contain stacked wild symbols, iterations of bonus game operations may be repeatedly carried out. These operations may include determining a symbol set for display on the plurality of reels, where any special symbol appearing on a particular reel results in the wild symbols on the particular reel being stacked.

20 Claims, 25 Drawing Sheets

(56) References Cited

U.S. PATENT DOCUMENTS

| | | | | |
|---|---|---|---|---|
| 6,743,102 | B1 | 6/2004 | Fiechter et al. | |
| 6,855,054 | B2 | 2/2005 | White et al. | |
| 6,939,228 | B2 | 9/2005 | Shimizu | |
| 7,063,617 | B2 | 6/2006 | Brosnan et al. | |
| 7,090,580 | B2 | 8/2006 | Rodgers et al. | |
| 7,237,775 | B2 | 7/2007 | Thomas et al. | |
| 7,331,862 | B2 | 2/2008 | Rodgers et al. | |
| 7,331,866 | B2 | 2/2008 | Rodgers et al. | |
| 7,331,867 | B2 | 2/2008 | Baelocher et al. | |
| 7,341,518 | B2 | 3/2008 | Muskin | |
| 7,393,278 | B2 | 7/2008 | Gerson et al. | |
| 7,850,521 | B2 | 12/2010 | Rodgers et al. | |
| 7,857,695 | B2 | 12/2010 | Rodgers et al. | |
| 7,950,994 | B2 | 5/2011 | Berman et al. | |
| 8,430,743 | B2 | 4/2013 | Moshal | |
| 8,734,237 | B2 | 5/2014 | Moshal | |
| 9,224,270 | B2 * | 12/2015 | Lee | G07F 17/3267 |
| 9,830,780 | B2 * | 11/2017 | Cuddy | G07F 17/34 |
| 2002/0045474 | A1 | 4/2002 | Singer et al. | |
| 2002/0151359 | A1 | 10/2002 | Rowe | |
| 2003/0064810 | A1 | 4/2003 | Okada | |
| 2003/0155715 | A1 | 8/2003 | Walker et al. | |
| 2003/0162588 | A1 | 8/2003 | Brosnan et al. | |
| 2004/0032086 | A1 | 2/2004 | Barragan | |
| 2004/0254011 | A1 | 12/2004 | Muskin | |
| 2004/0259640 | A1 | 12/2004 | Gentles et al. | |
| 2005/0010715 | A1 | 1/2005 | Davies et al. | |
| 2005/0153778 | A1 | 7/2005 | Nelson et al. | |
| 2005/0170883 | A1 | 8/2005 | Muskin | |
| 2006/0264254 | A1 | 11/2006 | Aoki | |
| 2007/0054732 | A1 | 3/2007 | Baerlocher | |
| 2007/0060303 | A1 | 3/2007 | Govender et al. | |
| 2007/0060314 | A1 | 3/2007 | Baerlocher et al. | |
| 2007/0060317 | A1 | 3/2007 | Martin | |
| 2007/0167226 | A1 | 7/2007 | Kelly et al. | |
| 2008/0039171 | A1 | 2/2008 | Slomiany et al. | |
| 2008/0076574 | A1 | 3/2008 | Okada | |
| 2008/0108411 | A1 | 8/2008 | Jensen et al. | |
| 2008/0287178 | A1 | 11/2008 | Berman et al. | |
| 2009/0054129 | A1 | 2/2009 | Yoshimura et al. | |
| 2009/0104979 | A1 | 4/2009 | Ruymann | |
| 2009/0156303 | A1 | 6/2009 | Kieley et al. | |
| 2010/0120525 | A1 | 5/2010 | Baerlocher et al. | |
| 2011/0028202 | A1 | 2/2011 | Naicker et al. | |
| 2012/0015713 | A1 | 1/2012 | Cannon | |
| 2012/0122546 | A1 | 5/2012 | Lange | |
| 2012/0295688 | A1 * | 11/2012 | Watkins | G07F 17/3211 463/20 |
| 2013/0184047 | A1 | 7/2013 | Haykin et al. | |
| 2015/0248811 | A1 | 9/2015 | Wortmann et al. | |
| 2016/0351005 | A1 | 12/2016 | Igesund | |
| 2016/0351006 | A1 | 12/2016 | Igesund | |

FOREIGN PATENT DOCUMENTS

| | | |
|---|---|---|
| CA | 2827968 | 3/2014 |
| CA | 2868773 | 4/2015 |
| EP | 1351180 | 10/2003 |
| EP | 2615591 | 3/2013 |
| EP | 2713347 | 4/2014 |
| EP | 2866211 | 4/2015 |
| EP | 2894612 | 7/2015 |
| EP | 2916299 | 9/2015 |
| GB | 2139390 | 11/1984 |
| WO | 2002/41963 | 5/2002 |
| WO | 2006/027677 | 3/2006 |

OTHER PUBLICATIONS

Canadian Intellectual Property Office, Office Action dated Mar. 13, 2017, issued in connection with Canadian Patent Application No. 2929218, 6 pages.

Australian Patent Office, Patent Examination Report No. 1, dated Dec. 20, 2012, issued in connection with Australian Patent Application No. 2011253848, 4 pages.

Canadian Paten Office, Examiner's Report dated Feb. 5, 2013, issued in connection with CA Application No. 27602112, 2 pages.

European Patent Office, Extended European Search Report dated Oct. 26, 2010, issued in connection with EP Application No. 10251152.4, 8 pages.

European Patent Office, Extended European Search Report dated Feb. 24, 2012, issued in connection with EP Application No. 11194636.4, 6 pages.

European Patent Office, Supplementary European Search Report dated Oct. 8, 2008, issued in connection with EP Application No. 05789874.4, 6 pages.

Final Office Action dated Jun. 23, 2010, issued in connection with U.S. Appl. No. 10/550,744, filed Aug. 24, 2006, 13 pages.

Final Office Action dated Sep. 28, 2009, issued in connection with U.S. Appl. No. 10/550,744, filed Aug. 24, 2006, 11 pages.

Intellectual Property Office, Combined Search Report and Abbreviated Examination Report dated Nov. 29, 2016, issued in connection with Application No. GB1509339.6, 7 pages.

Intellectual Property Office, Combined Search Report and Abbreviated Examination Report dated Nov. 29, 2016, issued in connection with Application No. GB1509340.4, 7 pages.

International Bureau, International Preliminary Report on Patentability, dated Mar. 13, 2007, issued in connection with International Application No. PCT/IB2005/002678, filed on Sep. 9, 2005, 4 pages.

International Searching Authority, International Search Report and Written Opinion dated Jan. 16, 2007, issued in connection with International Application No. PCT/IB2005/002678, filed on Sep. 9, 2005, 8 pages.

Non-Final Office Action dated Dec. 24, 2009, issued in connection with U.S. Appl. No. 10/550,744, filed Aug. 24, 2006, 12 pages.

Non-Final Office Action dated Apr. 4, 2008, issued in connection with U.S. Appl. No. 10/550,744, filed Aug. 24, 2006, 8 pages.

Notice of Allowability dated Nov. 26, 2010, issued in connection with U.S. Appl. No. 10/550,744, filed Aug. 24, 2006, 4 pages.

European Patent Office, Extended European Search Report dated Jun. 6, 2017, issued in connection with Application No. EP 17153144.5, 9 pages.

European Patent Office, European Search Report dated Jul. 27, 2016, issued in connection with EP Application No. 16171834.1, 8 pages.

European Patent Office, European Search Report dated Jun. 28, 2016, issued in connection with EP Application No. 16171832.5, 8 pages.

Australian Government, IP Australia, Examination Report No. 1 dated Mar. 29, 2017, issued in connection with Australian Patent Application No. 2016202965, 3 pages.

Australian Government, IP Australia, Examination Report No. 2 dated Jul. 14, 2017, issued in connection with Australian Patent Application No. 2016202966, 6 pages.

Canadian Intellectual Property Office, Examiner's Report dated Dec. 7, 2016, issued in connection with CA Application No. 2929222, 3 pages.

Final Office Action dated Sep. 14, 2012, issued in connection with U.S. Appl. No. 12/511,391, filed Jul. 29, 2009, 14 pages.

Non-Final Office Action dated Dec. 10, 2012, issued in connection with U.S. Appl. No. 12/974,690, filed Dec. 21, 2009, 25 pages.

Non-Final Office Action dated Mar. 29, 2012, issued in connection with U.S. Appl. No. 12/511,391, filed Jul. 29, 2009, 10 pages.

Non-Final Office Action dated Nov. 29, 2013, issued in connection with U.S. Appl. No. 13/856,124, filed Apr. 3, 2013, 19 pages.

Non-Final Office Action dated Jul. 31, 2013, issued in connection with U.S. Appl. No. 13/856,124, filed Apr. 3, 2013, 19 pages.

Notice of Allowance dated Apr. 10, 2014, issued in connection with U.S. Appl. No. 13/856,124, filed Apr. 3, 2013, 7 pages.

Notice of Allowance dated Mar. 11, 2013, issued in connection with U.S. Appl. No. 12/974,690, filed Dec. 21, 2009, 14 pages.

Wortman, Jonathan, U.S. Appl. No. 15/392,946, filed Dec. 28, 2016, 44 pages.

(56) References Cited

OTHER PUBLICATIONS

Canadian Intellectual Property Office, Examiner's Report, Canadian Patent Application No. 2,929,218, dated Jan. 16, 2018.
Australian Government (IP Australian), Examination report No. 3 for Australian Patent Application No. 2016202966, dated Nov. 21, 2017.

* cited by examiner

900

902

GAMING MACHINE WITH REARRANGEMENT OF WILD SYMBOLS

CROSS-REFERENCE TO RELATED APPLICATION

This application claims priority to U.K. Intellectual Property Office patent application no. 1509339.6, filed May 29, 2015, which is hereby incorporated by reference in its entirety.

BACKGROUND

Wager games come in a variety of forms, including for example a mechanical slot machine. A mechanical slot machine may include one or more reels, each of which includes a fixed pattern of symbols distributed around the circumference of the reel. When a player places a wager (e.g., by placing a coin in the machine), the player is allowed to spin the reels. Each reel then comes to rest, typically with either one of the symbols, or a space in between symbols, in alignment with a pay line. A predefined winning symbol or a predefined combination of winning symbols that are aligned with the pay line can result in the player winning the game and receiving a payout. In one example, the machine may include three reels, and the pay line may be a horizontal line disposed across a centre of each of the three reels.

In another example of a wager game, a mechanical slot machine may present symbols in a matrix arrangement, with each symbol changing during a spin of the game according to the fixed pattern. For example, the machine may have five columns and three rows of symbols, for a total of fifteen symbols. Such machines often have multiple pay lines, each being defined by a collection of positions within the matrix. For example, the machine may have three pay lines, each corresponding to one row of the matrix.

While slot machines were traditionally mechanical, modern slot machines often take the form of a video gaming machine (e.g., a dedicated gaming machine located in a casino) that includes a graphical user interface (GUI), and that may emulate a mechanical slot machine. With a video gaming machine, the GUI may display an image of one or more reels or a matrix as described above, together with animation effects to simulate a spin of the one or more reels, or a spin of the columns or rows of the matrix. A computer software program, which may reside in the video gaming machine, may randomly select one or more symbols in response to a spin, and may display the selected one or more symbols on the display.

A modern slot machine may also be played over a computer network, such as by a player using a client machine that is connected to a server machine over the computer network. In this instance, the server machine may perform the spins of the game and may send the resulting symbols to the client machine for display.

The popularity of video slot games has increased due to the incorporation of novel features, such as "wild" symbol into such video slot games. These features may assist in making winning results and provide a player with entertainment and additional opportunities to win games.

SUMMARY

Viewed from one aspect, the disclosure provides a machine including a display configured to display symbols in a wager outcome event; a processor; and a non-transitory computer-readable medium storing program instructions, that when executed by the processor, cause a set of operations to be performed, the set of operations including: determining that a trigger event for a bonus game occurred during a base outcome event of a base game, wherein the base game and the bonus game are both reel-based games being executed on behalf of a client machine, wherein both the base game and the bonus game involve spinning a plurality of reels, each reel containing a respective plurality of symbols, to determine outcome events, and wherein the symbols on each reel include at least two unstacked wild symbols; in response to determining that the trigger event occurred, awarding an instance of the bonus game, wherein a special symbol is included on each reel for the bonus game; and until all of the reels contain stacked wild symbols, repeatedly carrying out iterations of bonus game operations comprising: (i) determining a symbol set for display on the plurality of reels, wherein the displayed symbol set represents an outcome of a bonus game spin of the plurality of reels, wherein any special symbol appearing on a particular reel results in the wild symbols on the particular reel being stacked, and wherein stacked wild symbols are adjacent to one another on the particular reel, (ii) determining a bonus payout amount associated with the displayed symbols, and (iii) transmitting an indication of the bonus payout amount to the client machine.

Viewed from a second aspect, the disclosure provides a method including: determining that a trigger event for a bonus game occurred during a base outcome event of a base game, wherein the base game and the bonus game are both reel-based games being executed on behalf of a client machine, wherein both the base game and the bonus game involve spinning a plurality of reels, each reel containing a respective plurality of symbols, to determine outcome events, and wherein the symbols on each reel include at least two unstacked wild symbols; in response to determining that the trigger event occurred, awarding an instance of the bonus game, wherein a special symbol is included on each reel for the bonus game; and until all of the reels contain stacked wild symbols, repeatedly carrying out iterations of bonus game operations comprising: (i) determining a symbol set for display on the plurality of reels, wherein the displayed symbol set represents an outcome of a bonus game spin of the plurality of reels, wherein any special symbol appearing on a particular reel results in the wild symbols on the particular reel being stacked, and wherein stacked wild symbols are adjacent to one another on the particular reel, (ii) determining a bonus payout amount associated with the displayed symbols, and (iii) transmitting an indication of the bonus payout amount to the client machine.

Viewed from a third aspect, the disclosure provides a gaming system that includes: a plurality of gaming devices each including at least one display device and a plurality of input devices including (i) an acceptor of a physical item associated with a monetary value, (ii) a validator configured to identify the physical item, and (iii) a cash-out button actuatable to cause an initiation of a payout associated with a credit account; one or more gaming device processors; and one or more gaming device memory devices storing a plurality of gaming device instructions executable by the one or more gaming device processors to: determining that a trigger event for a bonus game occurred during a base outcome event of a base game, wherein the base game and the bonus game are both reel-based games being executed on behalf of a client machine, wherein both the base game and the bonus game involve spinning a plurality of reels, each reel containing a respective plurality of symbols, to determine outcome events, and wherein the symbols on each reel include at least two unstacked wild symbols; in response to determining that the trigger event occurred, awarding an instance of the bonus game, wherein a special symbol is included on each reel for the bonus game; and until all of the reels contain stacked wild symbols, repeatedly carrying out iterations of bonus game operations comprising: (i) determining a symbol set for display on the plurality of reels, wherein the displayed symbol set represents an outcome of a bonus game spin of the plurality of reels, wherein any special symbol appearing on a particular reel results in the wild symbols on the particular reel being stacked, and wherein stacked wild symbols are adjacent to one another on the particular reel, (ii) determining a bonus payout amount associated with the displayed symbols, and (iii) transmitting an indication of the bonus payout amount to the client machine.

Viewed from a fourth aspect, the disclosure provides a machine including a display configured to display symbols in a wager outcome event; a processor; and a non-transitory computer-readable medium storing program instructions, that when executed by the processor, cause a set of operations to be performed, the set of operations including: determining that a trigger event for a bonus game occurred during a base outcome event of a base game, wherein the base game and the bonus game are both reel-based games being executed on behalf of a client machine, and wherein both the base game and the bonus game involve spinning a plurality of reels, each reel containing a respective plurality of symbols, to determine outcome events; in response to determining that the trigger event occurred, awarding an instance of the bonus game, wherein a special symbol is included on each reel for the bonus game; and until all of the reels contain additional wild symbols, repeatedly carrying out iterations of bonus game operations comprising: (i) determining a symbol set for display on the plurality of reels, wherein the displayed symbol set represents an outcome of a bonus game spin of the plurality of reels, wherein any special symbol appearing on a particular reel results in at least one additional wild symbol being added to the particular reel, such that a number of symbols on the particular reel is increased, (ii) determining a bonus payout amount associated with the displayed symbols, and (iii) transmitting an indication of the bonus payout amount to the client machine.

Viewed from a fifth aspect, the disclosure provides a method including: determining that a trigger event for a bonus game occurred during a base outcome event of a base game, wherein the base game and the bonus game are both reel-based games being executed on behalf of a client machine, and wherein both the base game and the bonus game involve spinning a plurality of reels, each reel containing a respective plurality of symbols, to determine outcome events; in response to determining that the trigger event occurred, awarding an instance of the bonus game, wherein a special symbol is included on each reel for the bonus game; and until all of the reels contain additional wild symbols, repeatedly carrying out iterations of bonus game operations comprising: (i) determining a symbol set for display on the plurality of reels, wherein the displayed symbol set represents an outcome of a bonus game spin of the plurality of reels, wherein any special symbol appearing on a particular reel results in at least one additional wild symbol being added to the particular reel, such that a number of symbols on the particular reel is increased, (ii) determining a bonus payout amount associated with the displayed symbols, and (iii) transmitting an indication of the bonus payout amount to the client machine.

Viewed from a sixth aspect, the disclosure provides a gaming system that includes: a plurality of gaming devices each including at least one display device and a plurality of input devices including (i) an acceptor of a physical item associated with a monetary value, (ii) a validator configured to identify the physical item, and (iii) a cash-out button actuatable to cause an initiation of a payout associated with a credit account; one or more gaming device processors; and one or more gaming device memory devices storing a plurality of gaming device instructions executable by the one or more gaming device processors to: determining that a trigger event for a bonus game occurred during a base outcome event of a base game, wherein the base game and the bonus game are both reel-based games being executed on behalf of a client machine, and wherein both the base game and the bonus game involve spinning a plurality of reels, each reel containing a respective plurality of symbols, to determine outcome events; in response to determining that the trigger event occurred, awarding an instance of the bonus game, wherein a special symbol is included on each reel for the bonus game; and until all of the reels contain additional wild symbols, repeatedly carrying out iterations of bonus game operations comprising: (i) determining a symbol set for display on the plurality of reels, wherein the displayed symbol set represents an outcome of a bonus game spin of the plurality of reels, wherein any special symbol appearing on a particular reel results in at least one additional wild symbol being added to the particular reel, such that a number of symbols on the particular reel is increased, (ii) determining a bonus payout amount associated with the displayed symbols, and (iii) transmitting an indication of the bonus payout amount to the client machine.

In a seventh aspect, a system may include various means for carrying out each of the operations of any of the first, second, third, fourth, fifth and/or sixth aspects.

In embodiments of the disclosure in which a computer software product is used, the product may be non-transitory and store instructions on physical media such as a DVD, or a solid state drive, or a hard drive. Alternatively, the product may be transitory and in the form of instructions provided over a connection such as a network connection which is linked to a network such as the Internet.

These aspects, as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

I. Introduction

Figure 1:
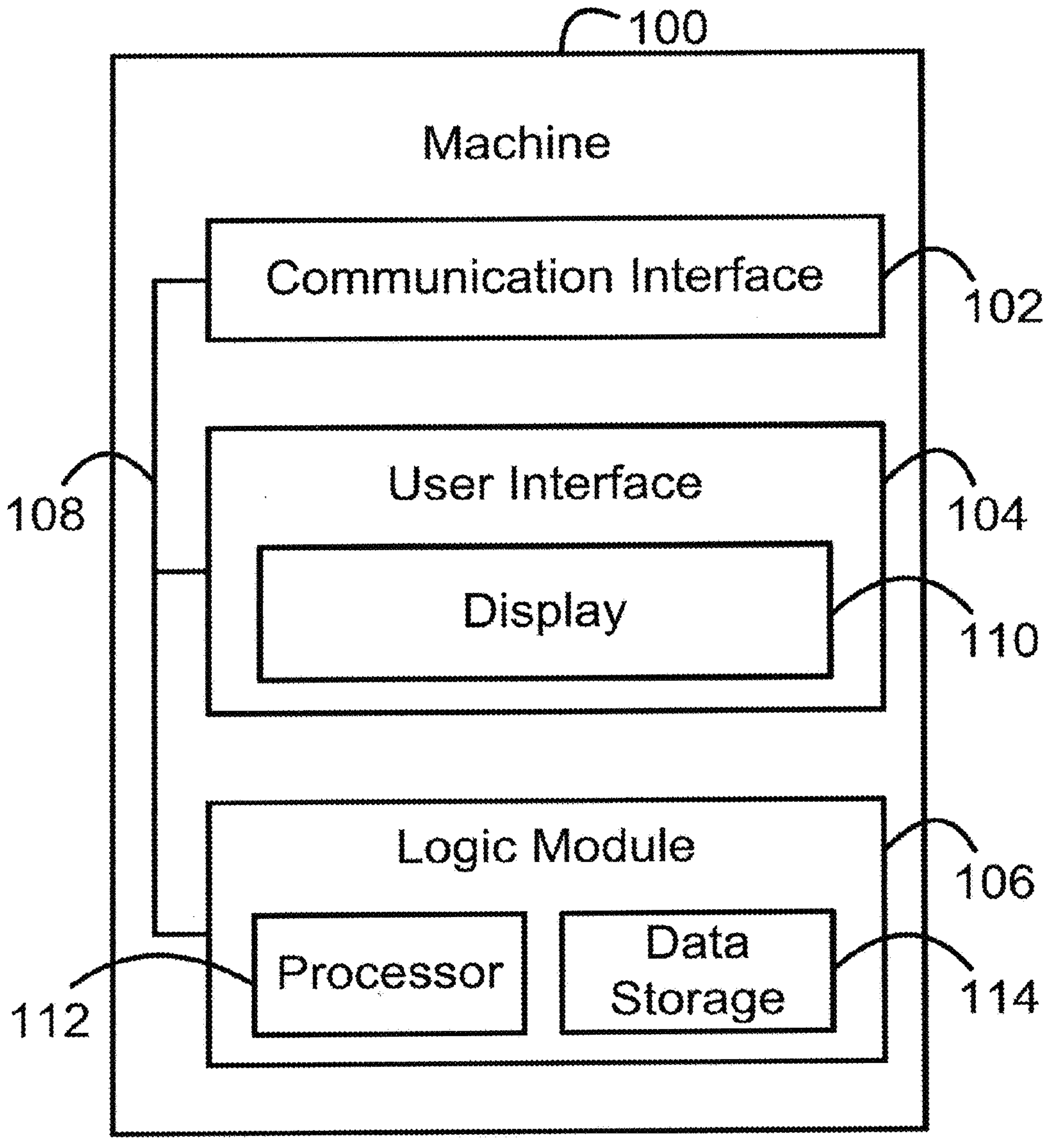
FIG. 1 is a simplified block diagram of a machine, in accordance with example embodiments.

This description describes several example embodiments including, but not limited to, example embodiments pertaining to performing aspects of an outcome event using a machine. Performing the outcome event can include playing a reel-based game. The machine can display a variety of symbols, possibly including wild symbols, during performance of an outcome event. As a result of certain outcome events, pre-existing wild symbols on one or more reels may be stacked—that is, the positions of the wild symbols on a reel may be changed so that the wild symbols are placed adjacent to one another. Alternatively or additionally, one or more wild symbols may be added to a reel, such that the number of symbols on that reel is increased. The added wild symbols may be stacked with one another (if two or more are added) and/or stacked with any pre-existing wild symbols that may be present on the reel.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Disclosed herein are machines and methods for carrying out aspects of outcome events that include displaying symbols, such as games, in particular, wager games. In one aspect, the machines and methods provide a feature that may enhance traditional wager games (e.g., slot machines or other reel-type games) by providing a player with additional opportunities to win the game, thereby increasing the player's interest, anticipation, and excitement in connection with the game. This may in turn benefit a casino or another entity that provides a game with this feature. Indeed, wager games are typically configured to have odds that favor the casino (sometimes referred to as the "house"). Accordingly, based on the law of averages, casinos often maximize their profits simply by getting more players to play more games. Due to the provided feature, players may be drawn in (e.g., from competing casinos that lack games with such a feature) and they may play the game often. The feature can include new data communications between a server machine and a client machine within a server-client based configuration.

II. Example Architecture

FIG. 1 shows a simplified block diagram of an example machine 100 arranged to implement operations in accordance with example methods described herein. Machine 100 may take any of a variety of forms, including for example a dedicated gaming machine, a personal computer, a server computer, a personal digital assistant, a mobile phone, a tablet device, or some other computing device.

Machine 100 may include a communication interface 102, a user interface 104, and a logic module 106, all of which may be coupled together by a system bus, network, or other connection mechanism 108. The communication interface 102 may include a wired or wireless network communication interface. For purposes of this description, any data described as being sent or transmitted by machine 100 can be data sent by communication interface 102 over a communication network. Also, for purposes of this description, any data described as being received by machine 100 can be data sent to communication interface 102 over a communication network.

The user interface 104 may facilitate interaction with a user (e.g., a player of a game) if applicable. As such, the user interface 104 may take the form of a GUI and may include output components such as a speaker and a display 110, and input components such as a keypad or a touch-sensitive screen. As described in greater detail below, display 110 may be configured to display, among other things, a symbol set in a game or a portion thereof.

The logic module 106 can take the form of a processor 112 and a data storage 114. The processor 112 can include a general-purpose processor (e.g., a microprocessor) or a special-purpose processor (e.g., a digital signal processor or an application specific integrated circuit) and may be integrated in whole or in part with the communication interface 102 or the user interface 104. Any processor discussed in this description or shown in the drawings can be referred to as a computer-readable processor. Any data storage discussed in this description or shown in the drawings can be referred to as computer-readable data storage.

Data storage 114 may include volatile or non-volatile storage components and may be integrated in whole or in part with processor 112. Data storage 114 may take the form of a non-transitory computer-readable medium and may include software program instructions, that when executed by processor 112, cause machine 100 to perform one or more of the operations described herein. Any software program instructions discussed in this description or shown in the drawings can be referred to as computer-readable program instructions, or more simply, program instructions.

Data storage 114 may also include operating system software on which machine 100 may operate. For example, machine 100 may operate on a VWindows®-based operating system (e.g., Windows XP or Windows 7) provided by the Microsoft® Corporation of Redmond, Washington. Other examples of operating systems are possible.

Figure 2:
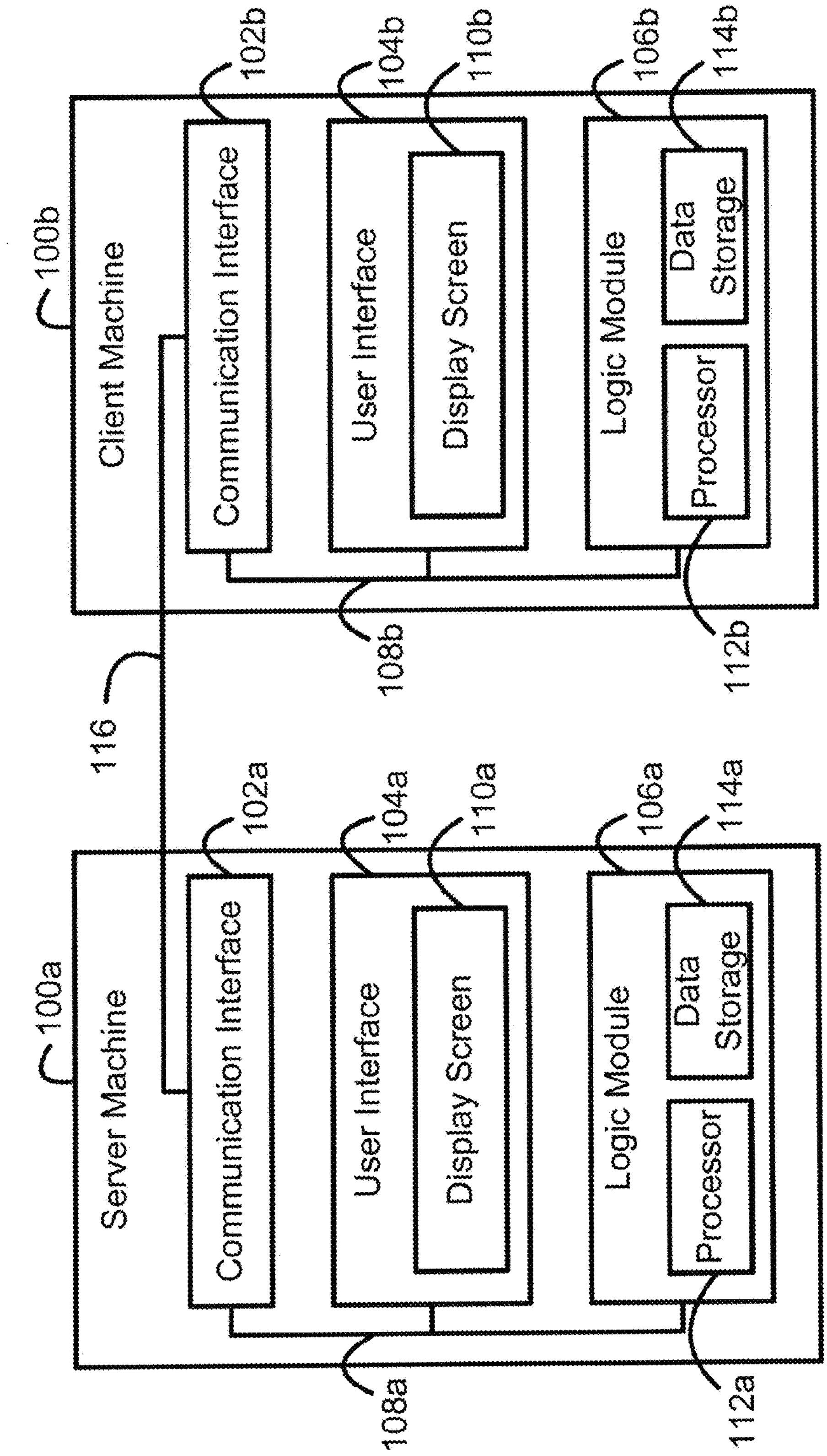
FIG. 2 is a simplified block diagram of an example server machine connected to an example client machine over a computer network, in accordance with example embodiments.

FIG. 2 is a simplified block diagram of an example server machine 100*a* connected to an example client machine (sometimes referred to as a workstation) 100*b* over a computer-network 116. A configuration of elements including server machine 100*a* and client machine 100*b* can be referred to as a server-client based configuration.

The components of the server machine 100*a* and the client machine 100*b* are shown with corresponding "a" and ""b" reference numerals (i.e., based on machine 100). Server machine 100*a* includes communication interface 102*a*, user interface 104*a* (which incorporates display screen 110*a*), logic module 106*a* (which incorporates processor 112*a* and data storage 114*a*), and communication bus 108*a*. Likewise, client machine 100*b* includes communication interface 102*b*, user interface 104*b* (which incorporates display screen 110*b*), logic module 106*b* (which incorporates processor 112*b* and data storage 114*b*), and communication bus 108*b*.

The server machine 100*a* is configured to communicate with the client machine 100*b* over the computer-network 116 (via the communication interfaces 102*a*, 102*b*). Likewise, the client machine 100*b* is configured to communicate with the server machine 100*a* over the computer-network 116. For purposes of this description, any data described as being sent or transmitted by the server machine 100*a* can be data sent by communication interface 102*a* over communication network 116. Similarly, any data described as being sent or transmitted by the client machine 100*b* can be data sent by communication interface 102*b* over communication network 116. Furthermore, for purposes of this description, any data described as being received by the server machine 100*a* can be data the server machine 100*a* receives from the communication network 116 using communication interface 102*a*. Similarly, any data described as being received by the client machine 100*b* can be data the client machine 100*b* receives from the communication network 116 using communication interface 102*b*.

The computer-network 116 for the server-client based configuration described above may take a variety of forms. For example, the computer-network 116 may be a local area network (LAN) in a casino, such that client machines 100*b* dispersed throughout the casino may communicate with the server machine 100*a* in the casino.

In another example, the computer-network 116 may be a wide-area network (WAN), such as an Internet network or a network of the World Wide Web. In such a configuration, the client machine 100*b* may communicate with the server machine 100*a* via a website portal (for a virtual casino) hosted on the server machine 100*a*. The data described herein as being transmitted by server machine 100*a* to client machine 100*b* or by client machine 100*b* to server machine 100*a* can be transmitted as datagrams according to the user datagram protocol (UDP), the transmission control protocol (TCP), or another protocol.

The computer-network 116 may include any of a variety of network topologies and network devices, and may employ traditional network-related technologies, including for example the public switched telephone network, cable networks, cellular wireless networks, WiFi, and WiMAX. Further, the computer-network 116 may include one or more databases (e.g., a player credit account database), to allow for the storing and retrieving of data related to performing an outcome event by a machine, as well as adjusting account balances associated with client machines.

For purposes of this description, any operation listed in a sentence including the words the "machine 100 can cause," the "server machine 100*a* can cause," or the "client machine 100*b* can cause" can be carried out, at least in part, as a result of that particular machine executing software program instructions. Those software program instructions can be stored within data storage 114, 114*a*, or 114*b*.

Figure 5:
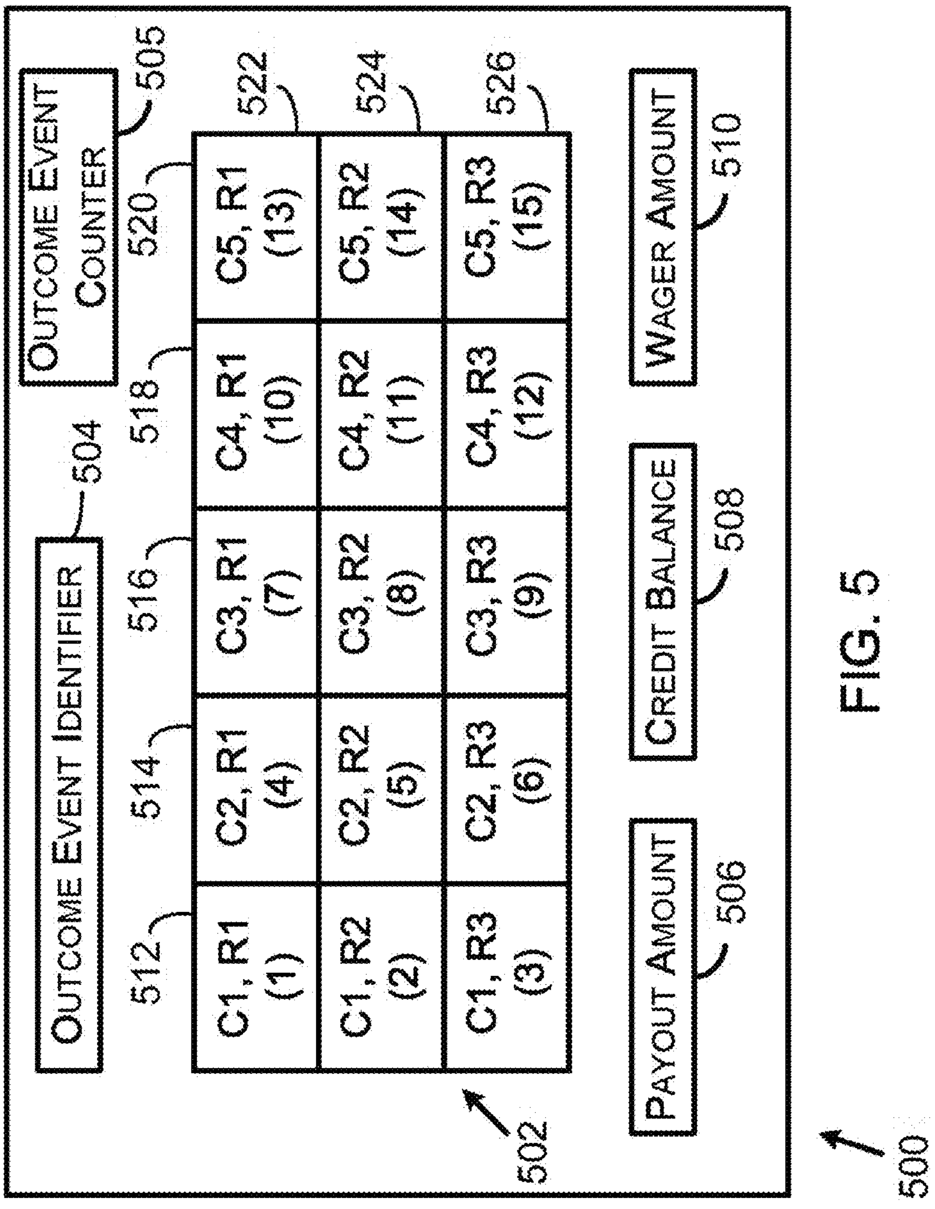
FIG. 5 depicts elements displayable by a display of a machine, in accordance with example embodiments.

Next, FIG. 5 depicts a screenshot 500 that machine 100, server machine 100*a*, or client machine 100*b* can visually present (i.e., display) using displays 110, 110*a*, and 110*b*, respectively. For purposes of this description, each element of screenshot 500 can be a displayable element of the display. Screenshot 500 includes a symbol-display-portion 502, an outcome event identifier 504, an outcome event counter 505, a payout amount indicator 506, a credit balance indicator 508, and a wager amount indicator 510.

Symbol-display-portion 502 can include multiple symbol-display-segments and multiple symbol positions. As an example, the symbol-display-segments can include vertical symbol-display-segments 512, 514, 516, 518, and 520 (or more simply, vertical SDS 512-520). As another example, the symbol-display-segments can include horizontal symbol-display-segments 522, 524, and 526 (or more simply, horizontal SDS 522-526). Each symbol-display-segment can include multiple symbol positions. The vertical SDS 512-520 are shown in FIG. 5 as having three symbol positions. The horizontal SDS 522-526 are shown in FIG. 5 as having five symbol positions. A person skilled in the art will understand that those symbol-display-segments can be configured with different numbers of symbol positions than shown in FIG. 5.

The vertical SDS 512-520 can be configured as spinnable reels. The processor of a machine or system displaying screenshot 500 can display the spinnable reels spinning and stopped after spinning. For vertical SDS 512-520, the spinnable reels may spin in a vertical direction (e.g., top to bottom or bottom to top, with respect to the symbol-display-portion 502).

The horizontal SDS 522-526 can be configured as spinnable reels. The processor of a machine or system displaying screenshot 500 can display the spinnable reels spinning and stopped after spinning. For horizontal SDS 522-526, the spinnable reels may spin in a horizontal direction (e.g., left to right or right to left, with respect to the symbol-display-portion 502).

Figure 7:
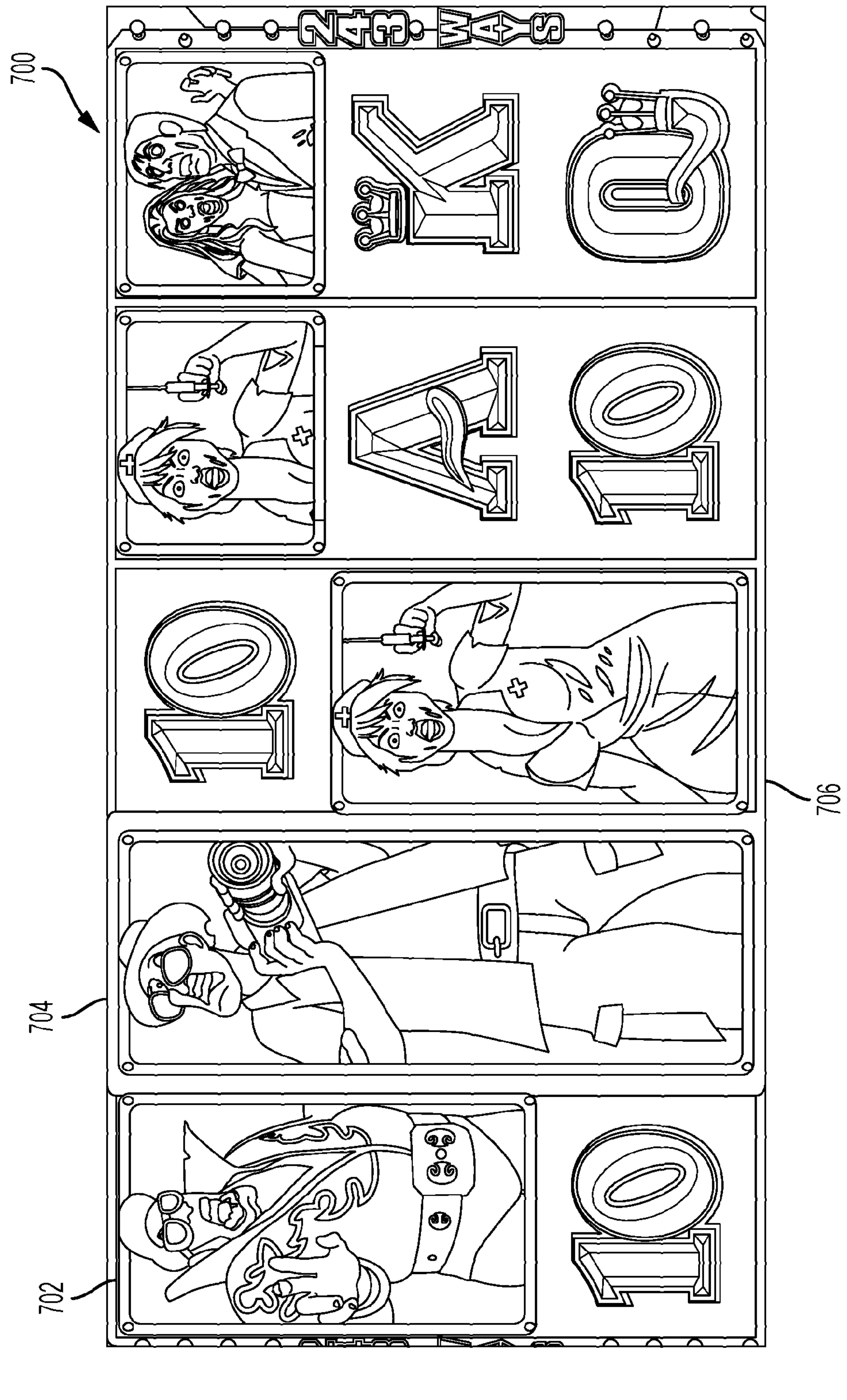
FIG. 7 depicts a second display, in accordance with example embodiments.

The multiple symbol positions in symbol-display-portion 502 are identified by column and row designators, in which C1=column 1, C2=column 2, C3=column 3, C4=column 4, C5=column 5, R1=row 1, R2=row 2, and R3=row 3. The multiple symbol positions in symbol-display-portion 502 are also identified by distinct numerical identifiers shown within parenthesis. C1 can be a first SDS. C2 can be a second SDS. C3 can be a third SDS. C4 can be a fourth SDS. C5 can be a fifth SDS. As shown in FIG. 7, C2 is between C1 and C3, C3 is between C2 and C4, and C4 is between C3 and C5.

For a matrix arrangement with 15 symbol positions as shown in FIG. 5, the numerical identifiers can be whole numbers 1 through 15, inclusive. The processors or machines described herein can be configured to select a symbol position of symbol-display-portion 502 using a random number generator that is configured to generate a number within the range 1 through N, inclusive, where N equals the number of symbol positions in symbol-display-portion 502. For the matrix arrangement, each symbol-display segment can be a distinct column of the multiple columns within the matrix. Alternatively, for the matrix arrangement, each symbol-display segment can be a distinct row of the multiple rows within the matrix.

The processor of the machines or systems described herein can determine a state the machine or system is operating in or an outcome event that can occur during the determined state of the machine or system. In response to making that determination, the processor can cause the outcome event identifier 504 to display an identifier of the outcome event that can occur during the determined state. For example, the outcome event identifier can identify a base outcome event, a bonus outcome event or another type of outcome event. The bonus outcome event can be a "free spins" outcome event or some other outcome event.

The processor of the machines or systems described herein can determine a wager amount placed on an outcome event, a payout amount after or during occurrence of an outcome event resulting in a win, a credit balance after or while decreasing a number of credits based on placement of a wager or after or while increasing a number of credits based on a determined payout amount, and a number of outcome events (e.g., spins of the reels) that have taken place so far in the bonus game. The processor can cause the determined wager amount to be displayed by the wager amount indicator 510, the determined payout amount to be displayed by the payout amount indicator 506, the determined credit balance to be displayed by the credit balance indicator 508, and the number of outcome events taken place so far to be displayed by the outcome event counter 505.

III. Example Operations

FIG. 3A, FIG. 3B, FIG. 3C and FIG. 3D (i.e., FIG. 3A-3D) depict a flowchart showing a set of operations 345 (or more simply, "the set 345") that can, for example, be carried out using machine 100. Nonetheless, some or all of these operations may be carried out on server machine 100*a* and/or client machine 100*b*.

The operations of the set 345 are shown within blocks labeled with even integers between 300 and 344, inclusive, and can pertain to a method in connection with machine 100. The example method can relate to performing outcome events, such as a wager game. Any other operation(s) described herein as being performed by machine 100 can be performed prior to, while, or after performing any one or more of the operations of the set 345, unless context clearly dictates otherwise. Those other operation(s) can be performed in combination with or separately from any one or more of the operations of the set 345. Any operation described below, or elsewhere in this description, with respect to FIG. 3A, FIG. 3B, FIG. 3C or FIG. 3D, can be performed, at least in part, by a processor, such as processor 112 executing software program instructions.

Figure 3A:
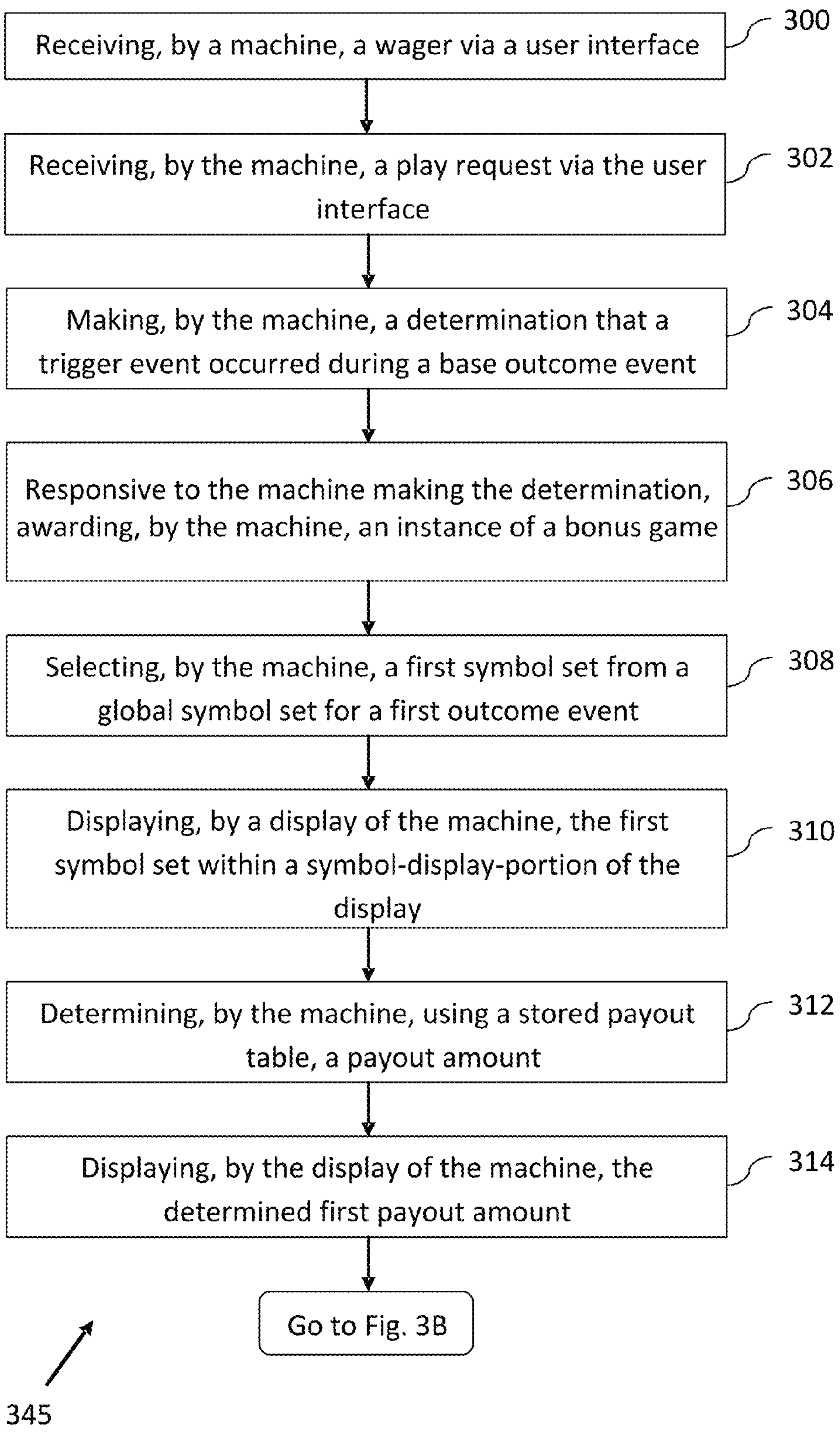
FIG. 3A is a first part of a flow chart, in accordance with example embodiments.

Turning to FIG. 3A, block 300 includes receiving, by machine 100, a wager via the user interface 104. In one example, this may allow a player to enter a wager (e.g., a wager amount) using a keypad of the user interface 104. The wager can be placed on an outcome event, such as, but not limited to, a base outcome event configured as a wager game. The received wager may or may not provide a user of the machine with an opportunity to earn (e.g., win) a payout. Since a received wager does not necessarily provide an opportunity to earn a payout, the received wager can be referred to as a payment. A base outcome event can be carried out after or in response to receiving a payment. Machine 100 can be configured such that a bonus outcome event can be carried out without receiving any additional payment after receiving a payment to carry out a base outcome event that results in an award of a predetermined number of bonus outcome events.

A player using machine 100 may have a corresponding player credit balance from which the entered wager may be deducted in response to the wager being entered or machine 100 receiving a play request from the player. For example, a player may have a player credit balance of 100,000 credits, which may be reduced to 99,750 credits upon the player requesting a play of the game with a wager of 250 credits. Additionally, or alternatively, the wager can be received by entry of a token, coin, or paper bill into the user interface 104 or by sliding or inserting a payment card, such as a credit or debit card, into the user interface 104. Machine 100 can cause display 110 to display wager information such as, but not limited to, a player credit balance on the credit balance indicator 508, possible wager amounts in wager amount indicator 510, and a received wager amount in wager amount indicator 510.

Next, block 302 includes receiving, by machine 100, a play request (e.g., a "spin" request) via the user interface 104. Receiving the play request can include or allow a player to pull a lever or push a button on machine 100 to initiate occurrence of an outcome event or to request a play of the wager game. Receiving the play request can result in the player's credit balance being reduced by an amount of the player's wager or a payment to carry out the outcome event.

Next, block 304 includes making, by machine 100, a determination that a trigger event occurred. The trigger event can be a randomly occurring event, such as an event that randomly occurs during performance of at least some base outcome events. For example, occurrence of the trigger event can include machine 100 selecting, using a random process, a trigger symbol from a group of symbols, such as in connection with a previous play of the game (e.g., a base outcome event). In another example, occurrence of the trigger event can include machine 100 selecting a trigger symbol for display in a particular arrangement position (e.g., in a middle row or a middle column). As yet another example, the trigger event can include machine 100 selecting, using a random number generator, a number in response to machine 100 receiving the play request, where the selected number is a trigger number. As still yet another example, the trigger event can include machine 100 displaying a particular combination of symbols selected from a global symbol set. Note that while a few example trigger events have been described above, any of a variety of other trigger events could be used to suit a desired configuration.

Making the determination that the trigger event occurred can occur while machine 100 operates in a first machine state (or more simply, the first state). Machine 100 can be configured such that, while machine 100 is operating in the first state, machine 100 allows the player to play base outcome events in which sets of symbols selected from a global symbol set can be selected by processor 112 and displayed by display 110.

Next, block 306 includes, responsive to machine 100 making the determination (i.e., the determination made at block 304), awarding, by machine 100, an instance of a bonus game. The bonus game may be a game that uses the same or similar reels as the base game. In some cases, the bonus game may be a reel-based game that incorporates different symbols on the reels. For instance, the bonus game may involve replacing some symbols on the reels with new symbols. One or more of the new symbols may be special symbols that have an impact on the duration of the bonus game and/or the payouts awarded to the player during the bonus game. The bonus game may continue for a number of consecutive spins of the reels. This number may be indeterminate, in that it is not pre-determined and instead is based on the sequence of outcome events that unfold as the bonus game is played. Thus, the number of spins that a particular instance of the bonus game involves may vary from, for example, as few as 5 to as many as 25 or more. Machine 100 can cause outcome event identifier 504 to identify the bonus outcome event awarded (e.g., a "free spins" bonus) and to cause the outcome event counter 505 to display the number of spins that have taken place so far in the instance of the bonus game.

Furthermore, in response to making the determination at block 304, machine 100 can transition from operating in the first state to operating in a second machine state (or more simply, the second state). Machine 100 can be configured such that, while machine 100 is operating in the second state, machine 100 allows the player to play bonus outcome events in which sets of symbols selected from a global symbol set can be selected by processor 112 and displayed by display 110. In accordance with an embodiment in which the symbol-display-portion includes 15 symbol positions, selecting a set of symbols for a bonus outcome event can include selecting 15 symbols.

Machine 100 can be configured to transition from operating in the second state back to operating in the first state. This transition can occur in response to machine 100 determining any of a variety of trigger events, such as, but not limited to, the bonus game ending, or a player stopping play of machine 100 before the bonus game has ended. Machine 100 can be configured to store a state of an instance of the bonus game, and to allow a player awarded the bonus game to commence playing any remaining consecutive plays of the bonus game at a time after the player initially stops performing (e.g., playing) the bonus game.

Next, block 308 includes selecting, by machine 100, a first symbol set to display within the symbol-display-portion 502 of display 110 for a first outcome event. The first outcome event can be an earliest occurring outcome event of an instance of the bonus game or any subsequent outcome event of the instance of the bonus game. Selecting the first symbol set can include processor 112 carrying out a random selection, such as a random selection of the first symbol set from the global symbol group.

Figure 6:
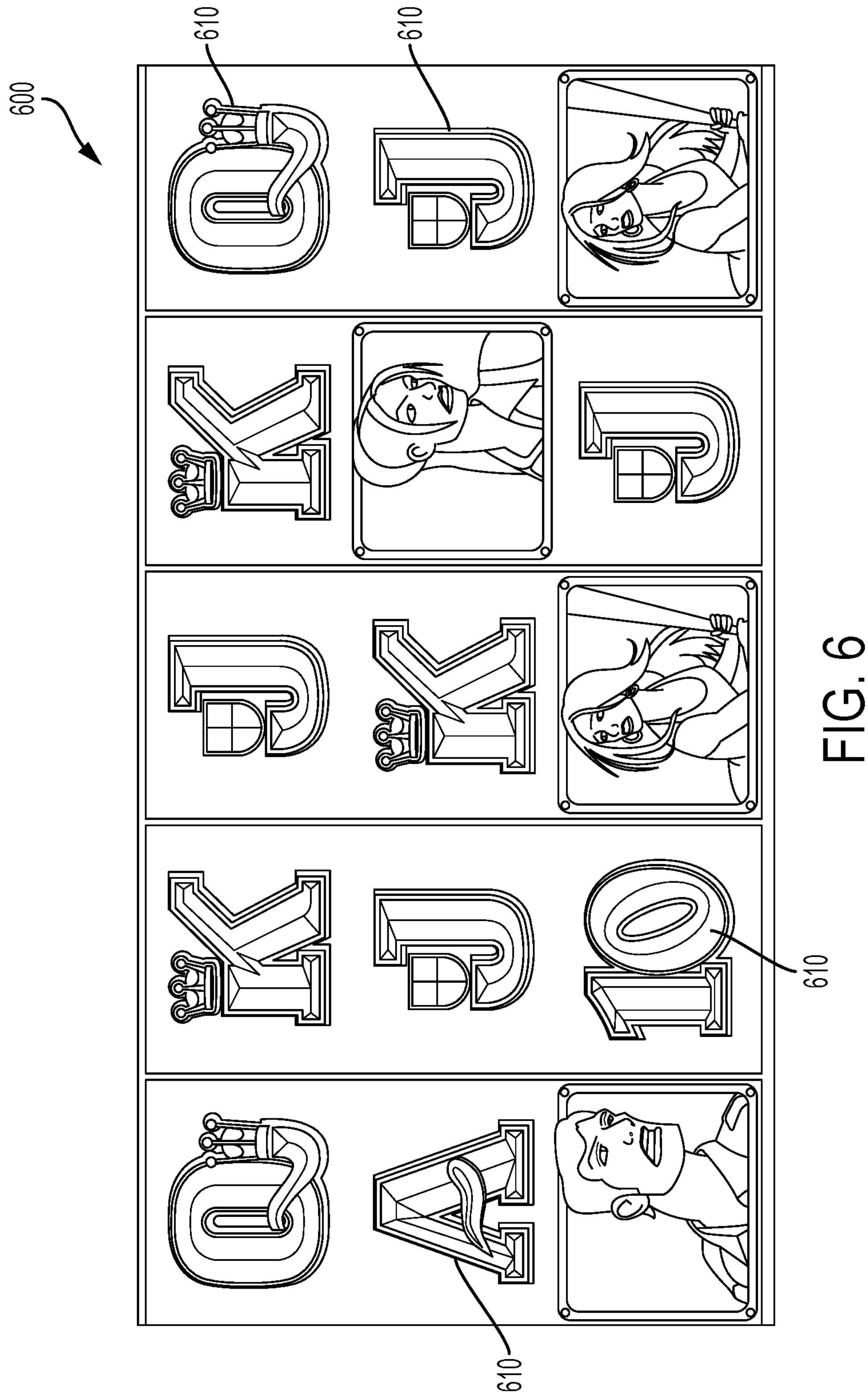
FIG. 6 depicts a first display, in accordance with example embodiments.

The global symbol group can include multiple symbols, such as different Portrait symbols, a wild, an Ace, a King, a Queen, a Jack and a Ten that may be used in connection with the outcome event, such as a wager game. The Ace, King, Queen, Jack and Ten symbols can represent symbols found on a standard deck of playing cards. FIG. 6 depicts examples of the aforementioned symbols and examples of other symbols that can be a part of the global symbol group. The global symbol group may be customized with particular symbols as desired.

Figure 4:
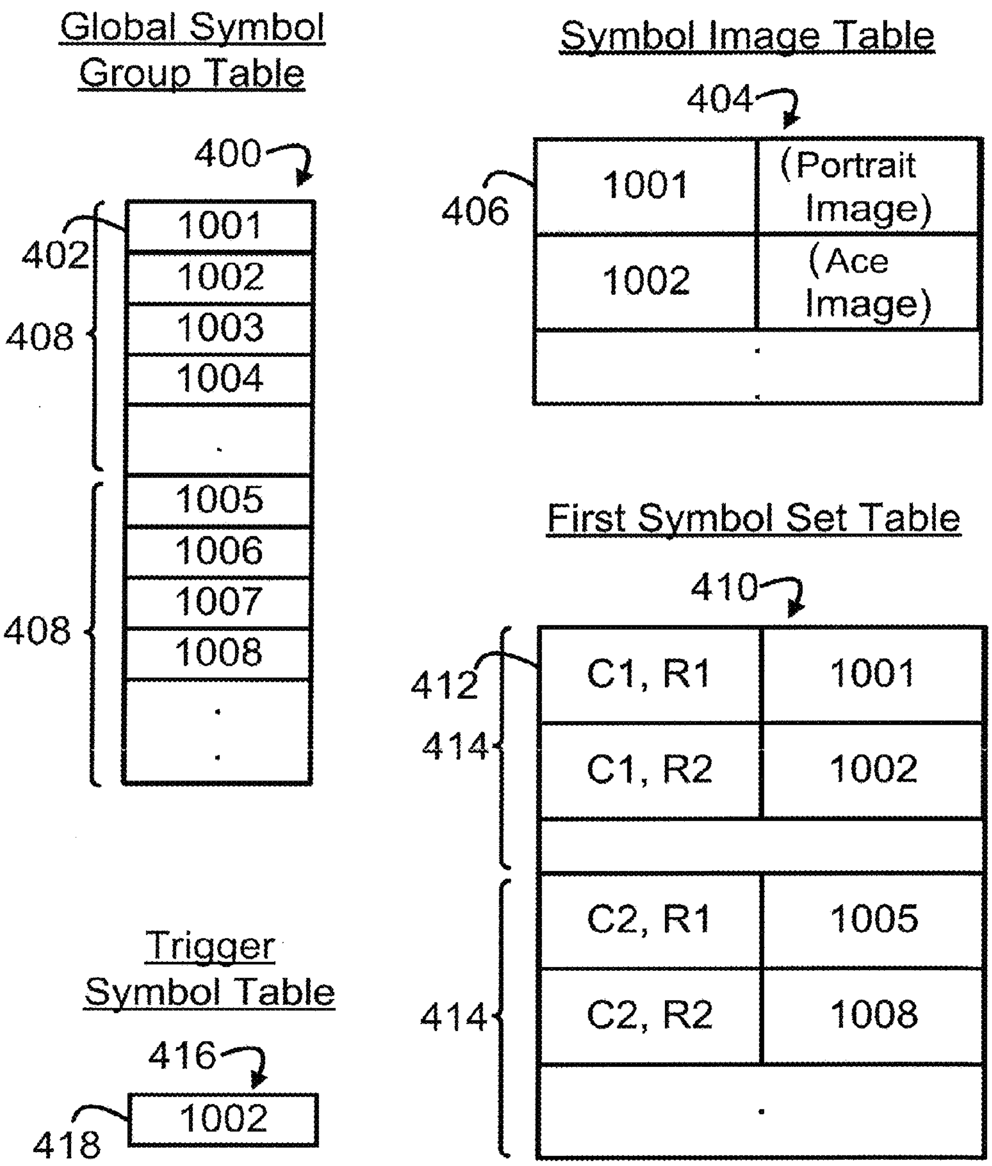
FIG. 4 depicts diagrams of tables that may be used with the processes, machines, and systems herein, in accordance with example embodiments.

In one example, the global symbol group may be represented as a table (or other data structure) stored in data storage 114. FIG. 4 shows an example global symbol group table 400. The global symbol group table 400 includes multiple records 402, each including an identifier (e.g., 1001, 1002, 1003 1004, etc.) that represents a particular symbol. In one example, the global symbol group, and therefore the global symbol table 400, may be divided into multiple sub-groups 408 as discussed in greater detail below.

The global symbol group table 400 may be used in connection with a symbol image table 404. The symbol image table 404 includes multiple records 406 (shown as distinct rows of table 404), each including an identifier that represents a particular symbol, and a corresponding displayable image. As such, the symbol image table 404 may be used to map an identifier in the global symbol group table 400 to a displayable image.

The selected first symbol set may be represented by a first symbol set table 410. The first symbol set table 410 includes multiple records 412 (shown as distinct rows in table 410), each record including an arrangement position of the symbol, and an identifier that represents the symbol. As such, each symbol in the selected first symbol set may correspond with a respective arrangement position in an arrangement (e.g. both a column number and a row number in a column-and-row arrangement). As an example, C1, R1, shown in the first symbol set table 410, represents a symbol position at column 1 (e.g., a left-most column of a plurality of columns in a symbol-display-portion 502 of display 110) and row 1 (e.g., a top row of a plurality of rows in a symbol-display-portion 502 of display 110). The column identifiers in table 410 (e.g., C1 and C2) can refer to columns in a symbol matrix or reels of a plurality of reels that can be spun.

In one example, machine 100 may select the first symbol set by iterating through each record 412 in the first symbol set table 410, and selecting a symbol identifier from among the symbol identifiers in the global symbol group table 400. In one example the symbol identifiers are numbers and machine 100 uses a random number generator to select such numbers, and therefore to randomly select symbols.

In one example, machine 100 may select each subset in the first symbol set from the corresponding sub-group in the global symbol group. This type of selection may be used when the symbol set represents one or more reels in a reel-type wager game. In this instance, each sub-group includes all the symbols of a given reel, and the selected sub-set includes the symbols of the reel that are "in play", namely those included in the selected first symbol set.

In one example, the first symbol set may be partially restricted. For instance, the first symbol set may include an instance of a predetermined symbol from the global symbol group, for example, a wild symbol. In another example, the predetermined symbol may be in a subgroup of global symbol group table 400 distinct from the subgroups from which symbols for the reels are selected.

As noted above, for each symbol in the selected first symbol set, the example embodiments can include machine 100 randomly determining a corresponding arrangement position. As such, in an example where the arrangement is a column-and-row arrangement, machine 100 may randomly determine a column identifier and a row identifier (from a set of potential column identifier and row identifier combinations) for each symbol in the selected first symbol set. In an example where the arrangement has symbol position identifiers (e.g., whole number 1 through 15, inclusive, as described above), machine 100 may randomly select a symbol position identifier for each symbol in the selected first symbol set.

Where the column and row arrangement is used to simulate reels, machine 100 may display the each subset in a corresponding column, such as by superimposing each subset over a virtual reel in a corresponding column. Further, a sub-group 408 may represent an ordering of symbols on a particular reel.

FIG. 6 shows an example of a first symbol set 600 from the global symbol group for display during a bonus outcome event. As described above, the bonus outcome event can be initiated pursuant to machine 100 making a determination that one or more of the awarded outcome events have not yet occurred (i.e., remain to occur). The displayed first symbol set 600 includes (i) a single first portrait symbol at arrangement position C1,R3; (ii) a pair of second portrait symbols at arrangement positions C3,R3 and C5,R3; (iii) a single third portrait symbol at arrangement position C4,R2; (iv) a single Ace symbol at arrangement position C1,R2; (v) three King symbols at arrangement positions C2,R1 and C3,R2 and C4,R1; (vi) two Queen symbols at arrangement positions C1,R1 and C5,R1; (vii) four Jack symbols at arrangement positions C2,R2 and C3,R1 and C4,R3 and C5,R2; and (viii) a single Ten symbol at arrangement position C2,R3.

In some cases, the global symbol set may include symbols that span more than one vertical position on display 110. For example, a symbol may span a plurality of rows in a symbol-display-portion 502 of display 110. These spanning symbols might not be included in the symbol set that is used for the base game. Turning to FIG. 7, a symbol set 700 includes three such symbols, exemplified by symbol 702 spanning symbol positions C1,R1 and C1,R2, symbol 704 spanning symbol positions C2,R1, C2,R2, and C2,R3, and symbol 706, spanning symbol positions C3,R2 and C3,R3.

In some embodiments, a spanning symbol might not be an additional symbol in the global symbol group, but may instead be composed of a stack of like symbols on a particular reel. Thus, in the same way that unstacked wild symbols become stacked during the bonus game (see below), other symbols (e.g., identical portrait symbols) may become stacked for the duration of the bonus game. A stack of 3 identical portrait symbols may be displayed as a single symbol that spans 3 rows on the display (e.g., symbols 704, 902, 1002 and 1004 in the drawings).

The global symbol set may also include special symbols that, for instance, may impact the duration of the bonus game. In some embodiments, certain types of spanning symbols may also be special symbols. For instance, in the embodiments described herein a spanning symbol that spans three rows of a reel (e.g., symbol 704) is a special symbol. However, other variations are possible.

Returning to FIG. 3A, block 310 includes displaying, by the machine 100 on the symbol-display-portion of the display 110, the selected first symbol set.

Next, block 312 includes determining, by machine 100, using a stored payout table (not shown), a first payout amount, where the first payout amount is a function of the selected first symbol set and the received wager. Processor 112 can execute program instructions to determine whether a payout is earned (e.g., won) as a result of each outcome event occurring at machine 100. If a payout is not earned, the payout amount can be zero. If a payout is earned, the payout amount can be a function of the received wager and the symbol set selected for the outcome event (e.g., the first symbol set selected for the first outcome event) or the corresponding arrangements of symbols in the selected first symbol set.

Next, block 314, includes displaying, by display 110 of machine 100, the determined first payout amount. For example, where machine 100 has determined, using the stored payout table, a first payout amount of 500 credits, machine 100 may display on display 110 the determined payout amount of 500 credits. Additionally or alternatively, machine 100 may add the determined payout amount to the player credit balance and display the updated player credit balance. For instance, where the player credit balance was 99,750 credits before the payout amount was determined, machine 100 may add the determined payout amount of 500 credits to the player credit balance so that the updated balance is 100,250 credits. Furthermore, machine 100 can cause display 110 to display a count-up from a first balance amount (e.g., 99,750 credits) to a second balance amount (e.g., 100,250 credits), where the second balance amount equals a sum of the first balance amount and the determined payout amount.

In one example, machine 100 may also physically dispense a corresponding payout (e.g., cash), or otherwise facilitate the payout to the player (by adding funds to an electronic account associated with a gaming card). Additionally or alternatively to determining the payout amount, machine 100 may perform other actions to award the player. For instance, the machine may display an indication of a tangible prize. Other types of awards may be used as well.

Figure 3B:
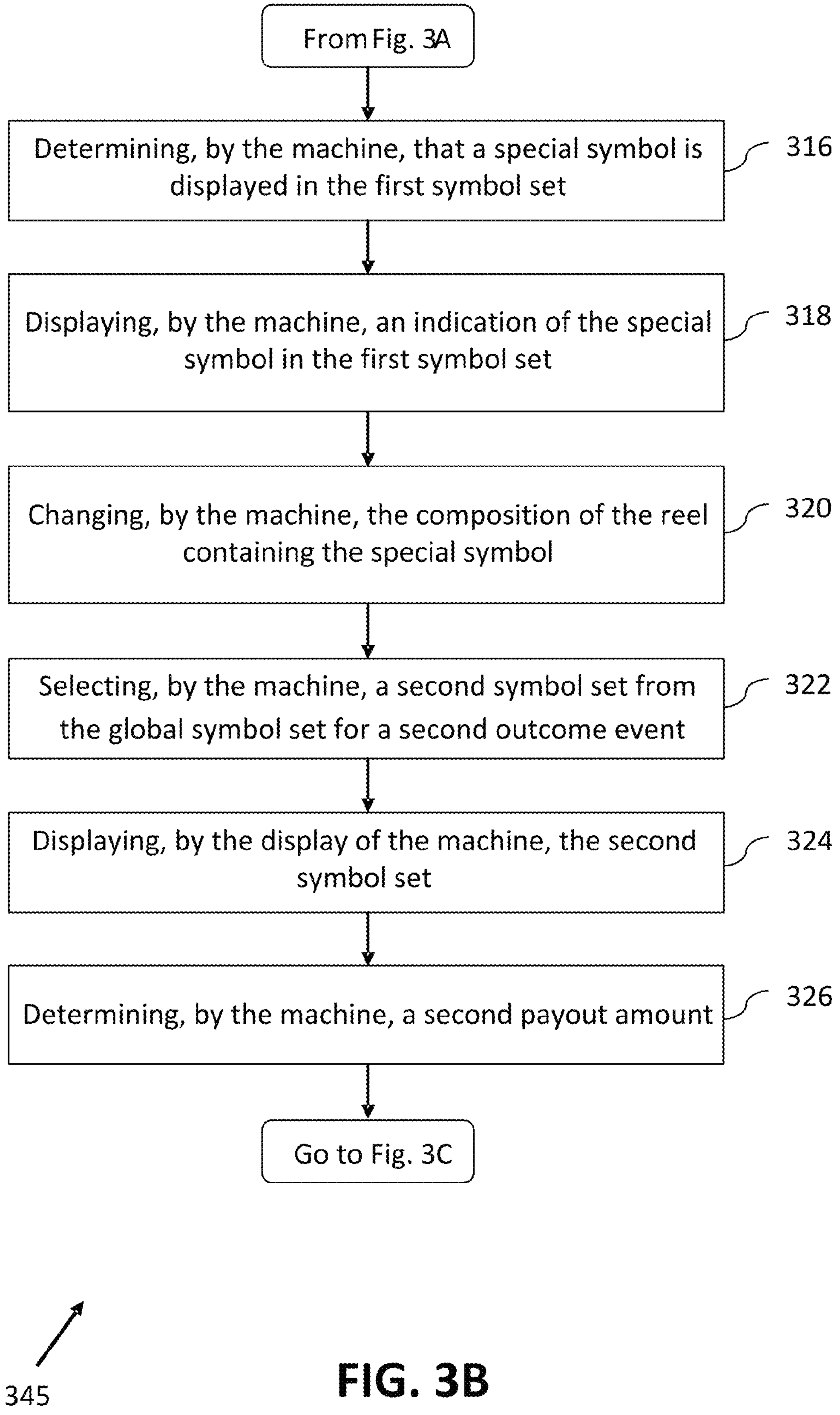
FIG. 3B is a second part of the flow chart of FIG. 3A, in accordance with example embodiments.

Turning to FIG. 3B, block 316 includes determining, by machine 100, that a special symbol is displayed in the first symbol set. As noted above, a special symbol may span three symbol positions on a reel, and symbol 704 is an example of a special symbol that spans symbol positions C2,R1, C2,R2, and C2,R3. Display of such a special symbol may change the state of the bonus game, in particular with respect to the behaviour and content of the reel on which the special symbol is displayed.

For instance, block 318 includes displaying, by display 110, an indication of the special symbol in the selected first symbol set. The display 110 may display such an indication by highlighting, shading, hatching or adding a border around the corresponding special symbol, but other indication techniques may also be used. In FIG. 7, a border is shown around symbol 704. This indication may remain on display 110, thus marking the reel as having displayed the special symbol.

In some cases, the special symbol may be removed from the reel after the reel is marked. Once a reel has been marked it may remain marked until the bonus game terminates. Thus, a special symbol might appear at most once on any particular reel. Other variations are possible.

Additionally, the composition of the reel containing the special symbol may change in response to the special symbol appearing on that reel. For example, any wild symbols on the reel may be "stacked" by placing them at adjacent symbol positions on the reel. In this way, the likelihood that two or more wild symbols appear on display 110 is increased. As another example, one or more wild symbols may be added to the reel containing the special symbol. Thus, the number of symbol positions on that reel may be increased. Further, the added wild symbols may be stacked with one another or with any pre-existing wild symbols on the reel.

Thus, block 320 includes changing, by machine 100, the composition of the reel containing the special symbol in accordance with any one or more of the embodiments discussed above. Accordingly, global symbol group table 400 may be modified to support this change. As an example, the number of symbol positions in a sub-group 408 may be increased to support additional wild symbols.

As noted above, a spanning symbol may be composed of a stack of like symbols on a particular reel. Thus, in the same way that unstacked wild symbols become stacked during the bonus game, other symbols may become stacked for the duration of the bonus game.

Next, block 322 includes selecting, by machine 100, a second symbol set from the global symbol set for a second outcome event. The second symbol set may be selected similarly to how the first symbol set is selected, and may also take into account how the composition of the reels has changed at block 320. Therefore, for instance, the second symbol set may include stacked wild symbols and/or additional wild symbols.

Next, block 324 includes displaying, by display 110 of machine 100, the second symbol set. This display may involve simulating a spin of the reels.

Next, block 326 includes determining, by machine 100, a second payout amount. The second payout amount may be a function of the selected second symbol set. For instance, the number of wild symbols and/or the number or pattern of other symbols may determine the second payout amount. Machine 100 may add the determined second payout amount to the player credit balance and display the updated player credit balance.

Figure 3C:
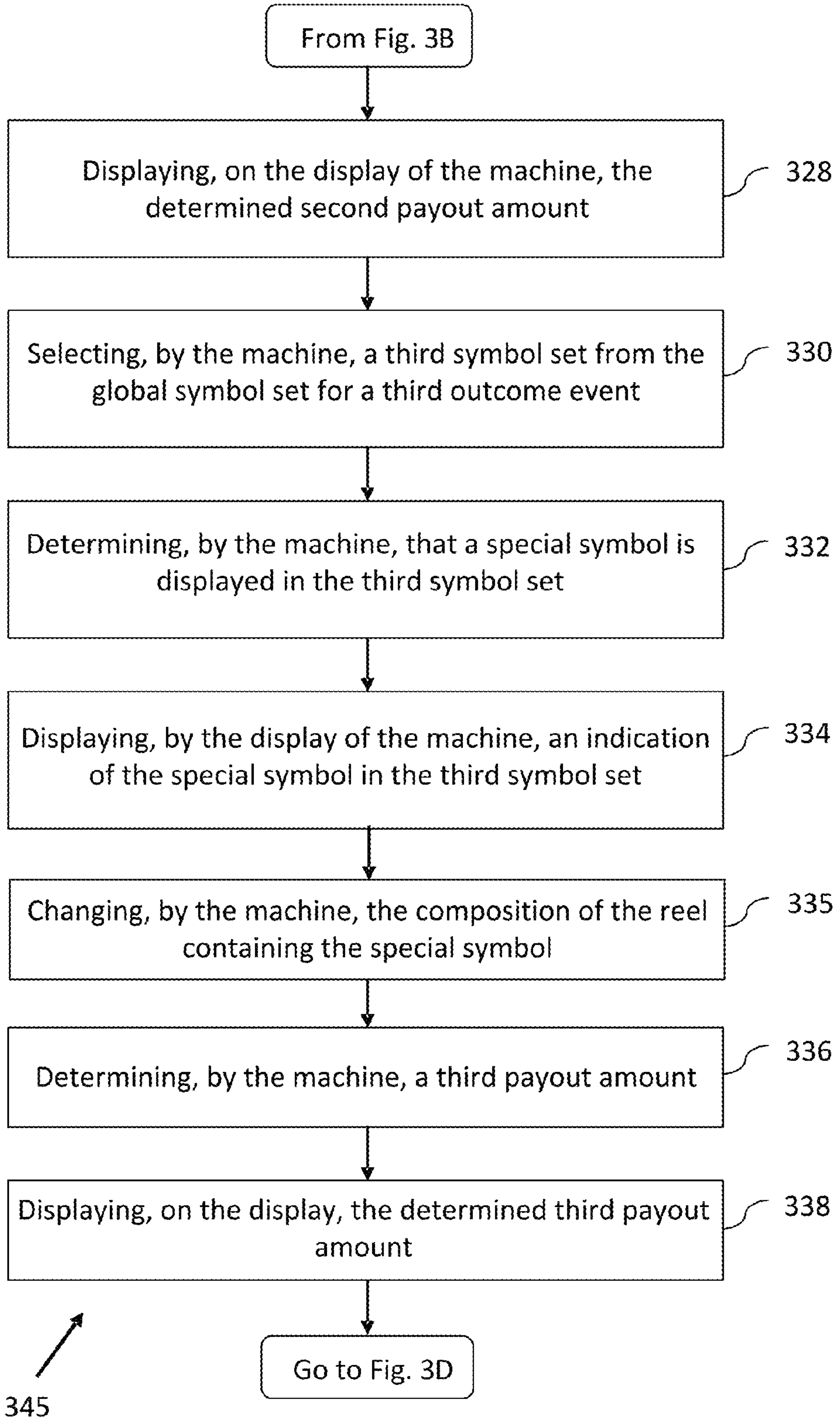
FIG. 3C is a third part of the flow chart of FIG. 3A, in accordance with example embodiments.

Turning to FIG. 3C, block 328 includes displaying, on the display 110, the determined second payout amount. In one example, the machine 100 may also physically dispense a corresponding payout amount (e.g., cash), or otherwise facilitate the payout to the player (by adding funds to an electronic account associated with a gaming card).

Next, block 330 includes selecting, by machine 100, a third symbol set from the global symbol set for a third outcome event. The third symbol set may be selected similarly to how the second symbol set is selected.

Next, block 332 includes determining, by machine 100, that a special symbol is displayed in the third symbol set. As was the case for block 316, the special symbol may span multiple symbol positions on a reel. Further, the special symbol may appear on a different reel from the reel that a special symbol appeared on at block 316, and may be different from that special symbol.

Next, block 334 includes displaying, by display 110 of machine 100, an indication of the special symbol in the third symbol set. As was the case for block 318, the display 110 may display such an indication by highlighting, shading, hatching or adding a border around the special symbol, but other indication techniques may also be used. Further, the special symbol may be removed from the reel after the reel is marked, and the composition of the reel containing the special symbol may change in response to the second symbol appearing on that reel. Again, any wild symbols on the reel may be "stacked" by placing them at adjacent symbol positions on the reel and/or one or more wild symbols may be added to the reel containing the special symbol.

Next, block 335 includes changing, by machine 100, the composition of the reel containing the special symbol in accordance with any one or more of the embodiments discussed above. Accordingly, global symbol group table 400 may be modified to support this change. As an example, the number of symbol positions in a sub-group 408 may be increased to support additional wild symbols.

Next, block 336 includes determining, by machine 100, a third payout amount. The third payout amount may be a function of the selected third symbol set. For instance, the number of wild symbols and/or the number or pattern of other symbols may determine the third payout amount.

Next, block 338 includes displaying, on the display 110, the determined third payout amount. Machine 100 may add the determined third payout amount to the player credit balance and display the updated player credit balance.

In one example, the operations of blocks 330 to 338 may be iterated repeatedly until machine 100 determines that all reels have been marked after the appearance of special symbols thereon.

Figure 3D:
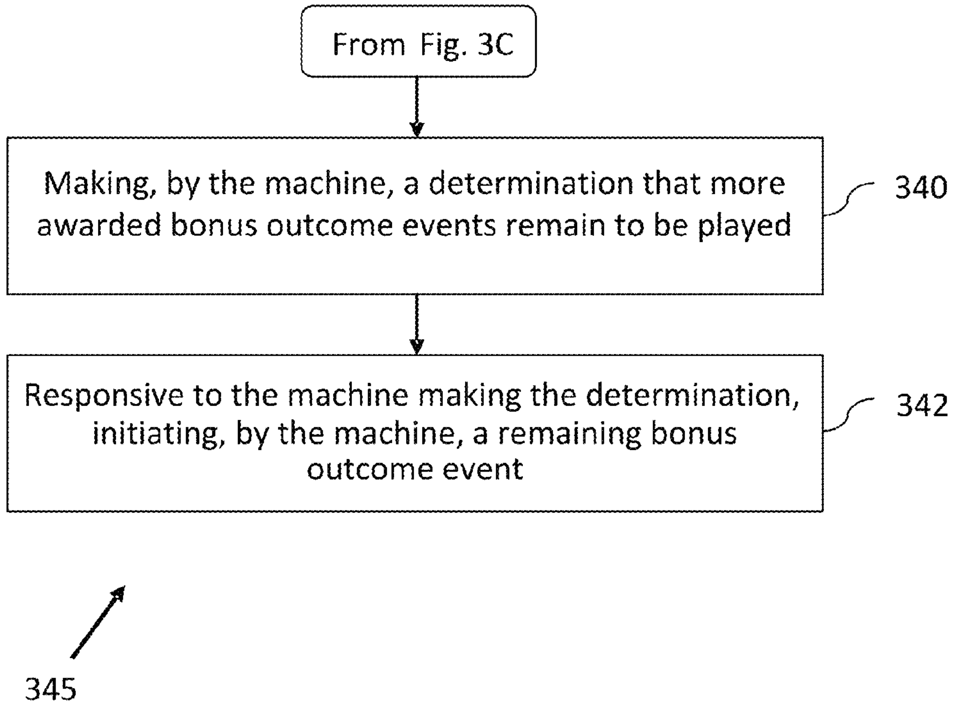
FIG. 3D is a fourth part of the flow chart of FIG. 3A, in accordance with example embodiments.

Turning to FIG. 3D, block 340 includes making, by machine 100, a determination that one or more of the awarded bonus outcome events remain to be played. In that regard, processor 112 may determine that one or more awarded bonus outcome events have not occurred. In response to making that determination, processor 112 can execute program instructions to determine a next symbol set.

Next, block 342 includes, responsive to machine 100 making the determination (i.e., the determination of block 340), initiating, by machine 100, a remaining bonus outcome event, as at block 330, by again selecting a symbol set from the global symbol group. In other words, portions of the set 345 can repeat to carry out distinct outcome events. Stated yet another way, carrying out a next outcome event can include determining, by processor 112, a symbol set to display within the symbol-display-portion 502 for the next outcome event.

FIG. 7 shows an example of a symbol set 700 selected from the global symbol group for display during a bonus outcome event. As described above, the bonus outcome event can be initiated pursuant to machine 100 making a determination that one or more of the awarded outcome events have not yet occurred (i.e., remain to occur). The displayed symbol set 700 includes three spanning symbols 702, 704, and 706. Symbol set 700 also includes two non-spanning portrait symbols appearing at respective symbol positions C4,R1 and C5,R1, as well as Ten symbols appearing at respective symbol positions C1,R3, C3,R1, and C4,R3, an Ace symbol appearing at symbol position C4,R2, a King Symbol appearing at symbol position C5,R2, and a Queen symbol appearing at symbol position C5,R3.

The machine 100 may determine a payout amount for symbol set 700. Various patterns of symbols may result in such a payout amount. For instance, if four or more of the same portrait symbol (spanning or otherwise) appear in symbol set 700, a payout may result. Alternatively or additionally, if two or more (or three or more) of the same portrait symbol appears along one of the pay lines, a payout may result. If a displayed symbol set contains one or more wild symbols, these wild symbols may represent any symbol, and therefore may be used to achieve one or more payouts.

Figure 8:
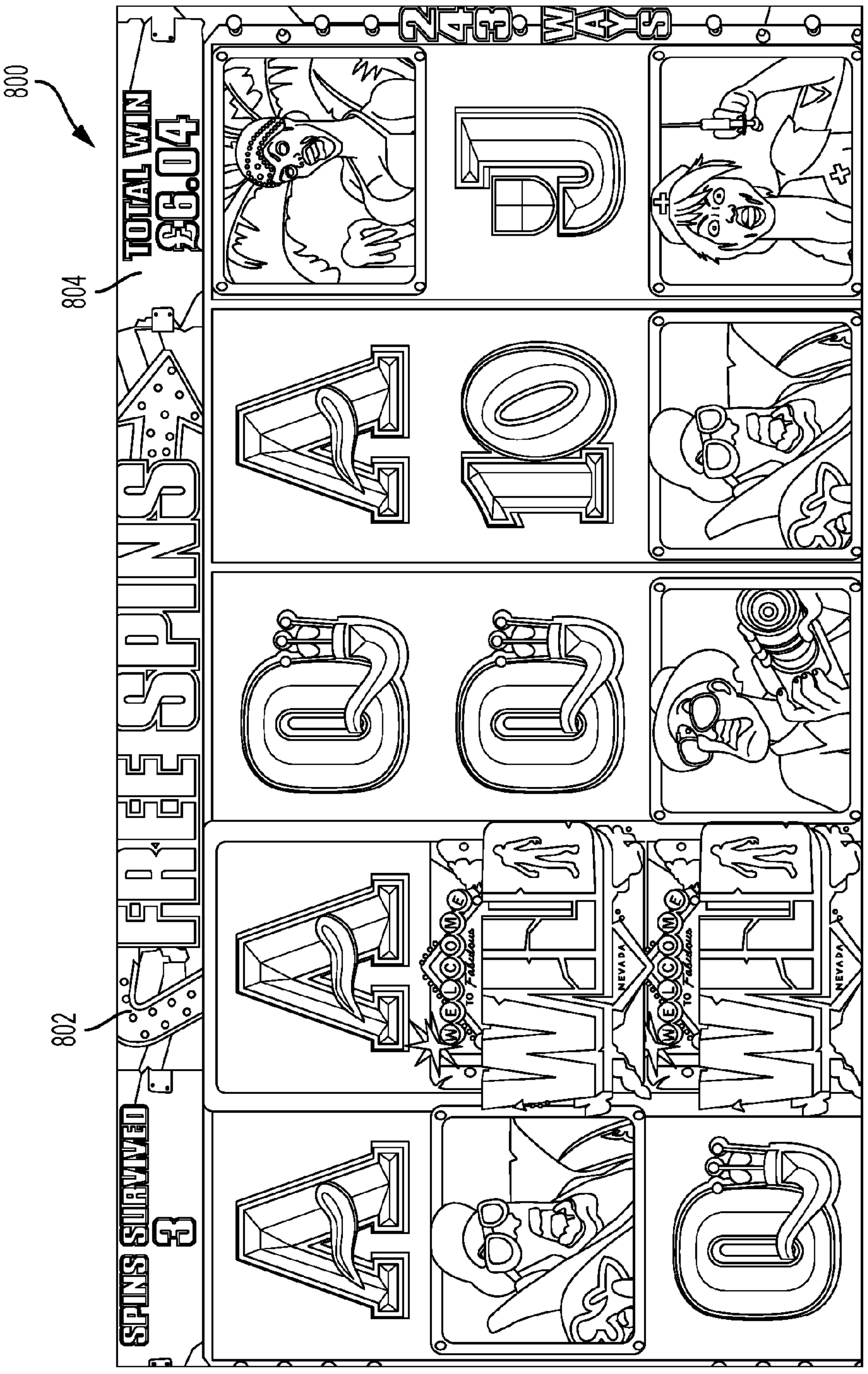
FIG. 8 depicts a third display, in accordance with example embodiments.

FIG. 8 shows an example of a symbol set 800 selected from the global symbol group for display during a bonus outcome event. Chronologically, symbol set 800 may appear in a bonus game after symbol set 700, as the reel of column 802 is marked. Further, the symbol set 800 displays two stacked wild symbols at respective symbol positions C2,R2 and C2,R3. These wild symbols may be used in combination with other symbols in symbol set 800 to trigger one or more payouts. For example, if a pay line includes respective symbol positions C1,R3, C2,R2, and C3,R1, the resulting three identical symbols in these symbol positions (e.g., the two Queen symbols and the one wild symbol at symbol position C2,R2 that can represent a Queen symbol) may trigger a payout. The payout may be displayed in payout amount indicator 804. The value shown therein may represent the payout amount of £6.04. This payout amount may be a payout amount attributable to symbol set 800, or a cumulative payout amount attributable to symbol set 800 as well as previously-displayed symbol sets.

Figure 9:
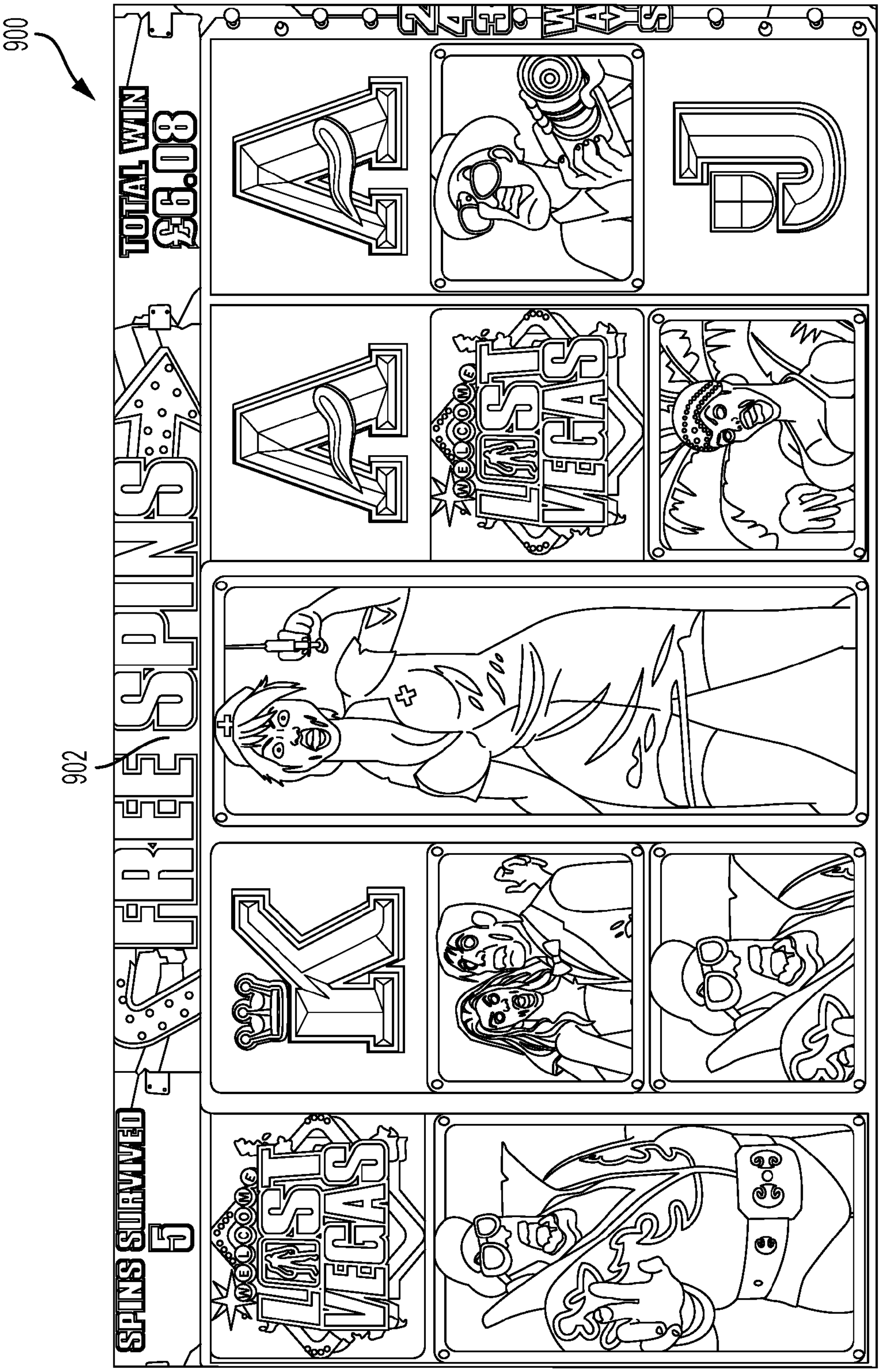
FIG. 9 depicts a fourth display, in accordance with example embodiments.

FIG. 9 shows an example of a symbol set 900 selected from the global symbol group for display during a bonus outcome event. In symbol set 900, a special symbol 902 (in this case, a symbol that spans respective symbol positions C3,R1, C3,R2, and C3,R3) is displayed. In response, machine 100 may display an indication of the special symbol (shown as a border in FIG. 9), thus marking the reel. Special symbol 902 may be removed from the reel after the reel is marked, and the composition of the reel previously containing special symbol 902 may change in response to special symbol 902 appearing on that reel. Any wild symbols on the reel may be "stacked" by placing them at adjacent symbol positions on the reel and/or one or more wild symbols may be added to the reel containing the special symbol.

Figure 10:
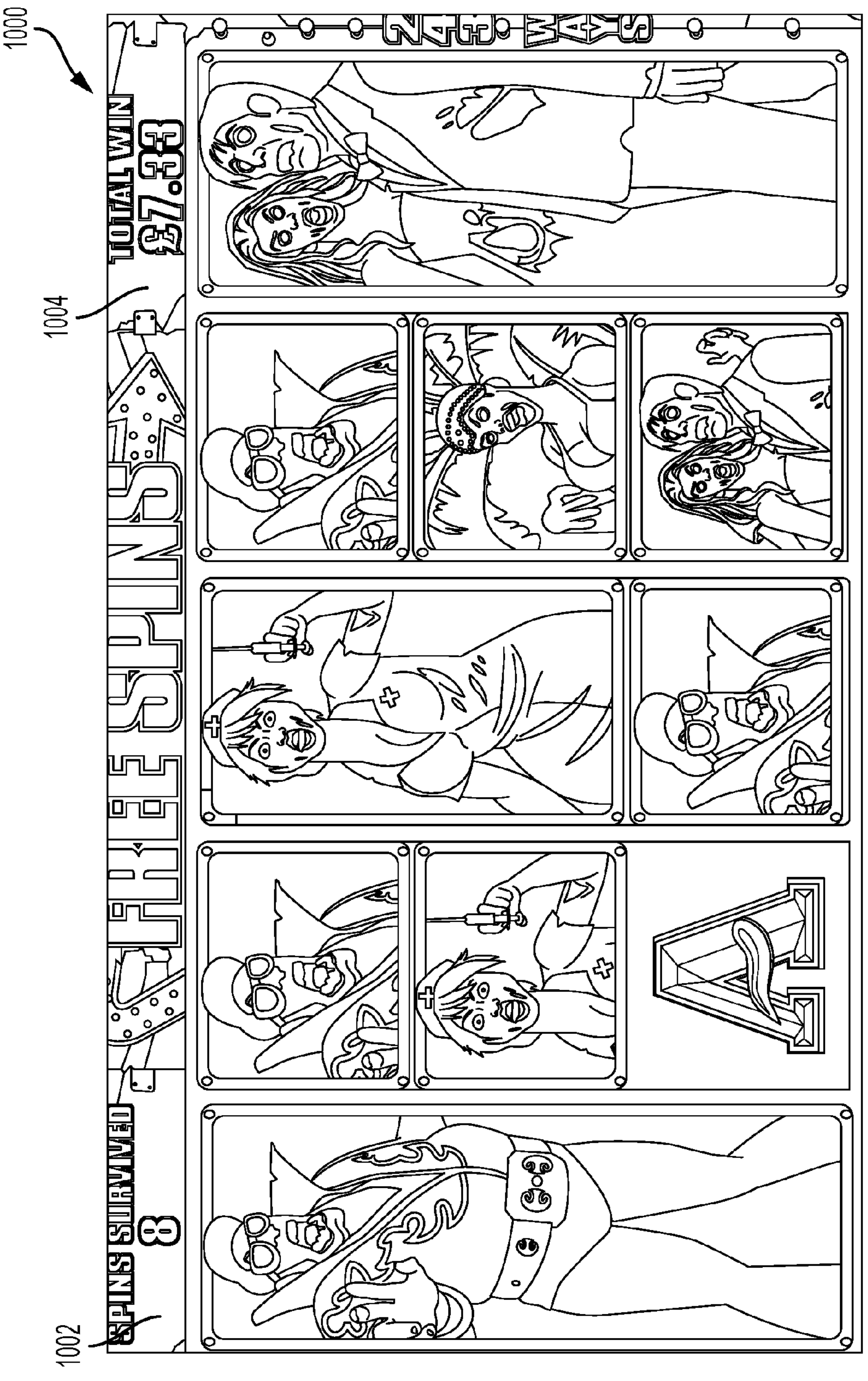
FIG. 10 depicts a fifth display, in accordance with example embodiments.

FIG. 10 shows an example of a symbol set 1000 selected from the global symbol group for display during a bonus outcome event. In symbol set 1000, a special symbol 1002 (in this case, a symbol that spans respective symbol positions C1,R1, C1,R2, and C1,R3) and a special symbol 1004 (in this case, a symbol that spans respective symbol positions C5,R1, C5,R2, and C5,R3) are displayed. In response, machine 100 may display an indication of the special symbols (shown as borders in FIG. 10), thus marking the reels. Special symbols 1002 and 1004 may be removed from their respective reels after these reels are marked, and the composition of the respective reels previously containing special symbols 1002 and 1004 may change in response to the special symbols appearing on those reels. Any wild symbols on these reels may be "stacked" by placing them at adjacent symbol positions on the respective reels and/or one or more wild symbols may be added to the respective reels containing the special symbols.

Figure 11:
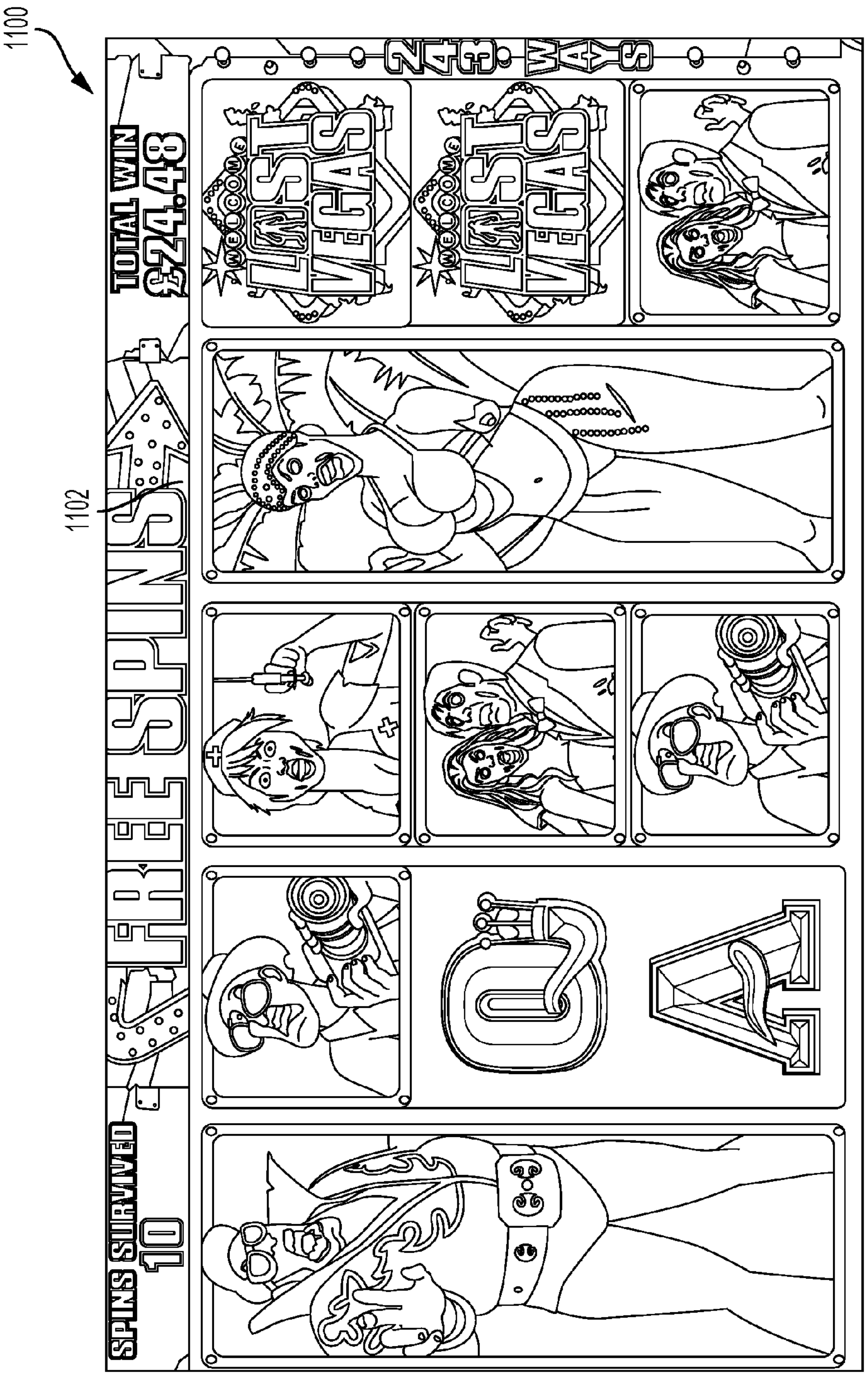
FIG. 11 depicts a sixth display, in accordance with example embodiments.

FIG. 11 shows an example of a symbol set 1100 selected from the global symbol group for display during a bonus outcome event. In symbol set 1100, a special symbol 1102 (in this case, a symbol that spans respective symbol positions C4,R1, C4,R2, and C4,R3) is displayed. In response, machine 100 may display an indication of the special symbol (shown as a border in FIG. 11), thus marking the reel. Special symbol 1102 may be removed from the reel after the reel is marked, and the composition of the reel previously containing special symbol 1102 may change in response to special symbol 1102 appearing on that reel. Any wild symbols on the reel may be "stacked" by placing them at adjacent symbol positions on the reel and/or one or more wild symbols may be added to the reel containing the special symbol.

At the point in the bonus game displayed in FIG. 11, all reels are marked. This may result in the bonus game being terminated, and play returning to that of the base game.

Machine 100 can cause symbol-display segments to spin, and to cause spinning symbol-display-segments to stop spinning. The spinning and stopping of the spinning symbol-display segments can be carried out for each outcome event. In accordance with the embodiments in which the symbol-display-portion 502 includes columns or reels that spin from top to bottom or bottom to top, spinning the reels can include starting the spinning from a left-most column or reel to a right-most column or reel. Stopping the reels can occur using a similar sequence. Other sequences of spinning and stopping the spinning can be used. Moreover, the spinning or stopping of spinning of two or more columns or reels could occur simultaneously.

Notably, the operations of replacing, reordering, adding, and/or removing symbols from a reel of a reel-based game (e.g., the operations of blocks 320 and 335 as just two possible examples), necessitate computer implementation. In a mechanical reel-based game, the symbols appearing on each reel are fixed and cannot be changed mid-game. In contrast, the computer implementation herein allows the number of symbols per reel to be changed, as well as the symbols appearing on each reel to be replaced and/or re-ordered. These changes can occur mid-game, for example between spins of the reels. Consequently, these features of the disclosure herein would not exist but for computer technology.

Further, these features are an improvement to reel-based gaming technology. Since the symbols appearing on each reel are fixed and cannot be changed mid-game in mechanical reel-based games, the operations of replacing, reordering, adding, and/or removing symbols from a reel could not appear in such games. Due to this technological limitation, players may become disinterested in these basic reel-based games. Computer implementation, however, facilitates the integration of these features into reel-based games, resulting in game dynamics that would otherwise be unavailable. Consequently, the disclosure herein is a technological improvement to reel-based games.

IV. Additional Example Operations

FIG. 12A-12E depict a flowchart showing a set of operations 1200 (or more simply, "the set 1200") that can, for example, be carried out using server machine 100*a*. Note that several of the operations described in connection with FIG. 12A-12E parallel operations described in connection with FIG. 3A-3D. As such, variations of the operations described in connection with FIG. 3A-3D are likewise applicable to the operations described in connection with Figures FIG. 12A-12E. However, for the sake of brevity, these variations are not repeated. The server machine 100*a*, in performing the set 1200, can perform the operations described above with respect to machine 100.

Figure 12A:
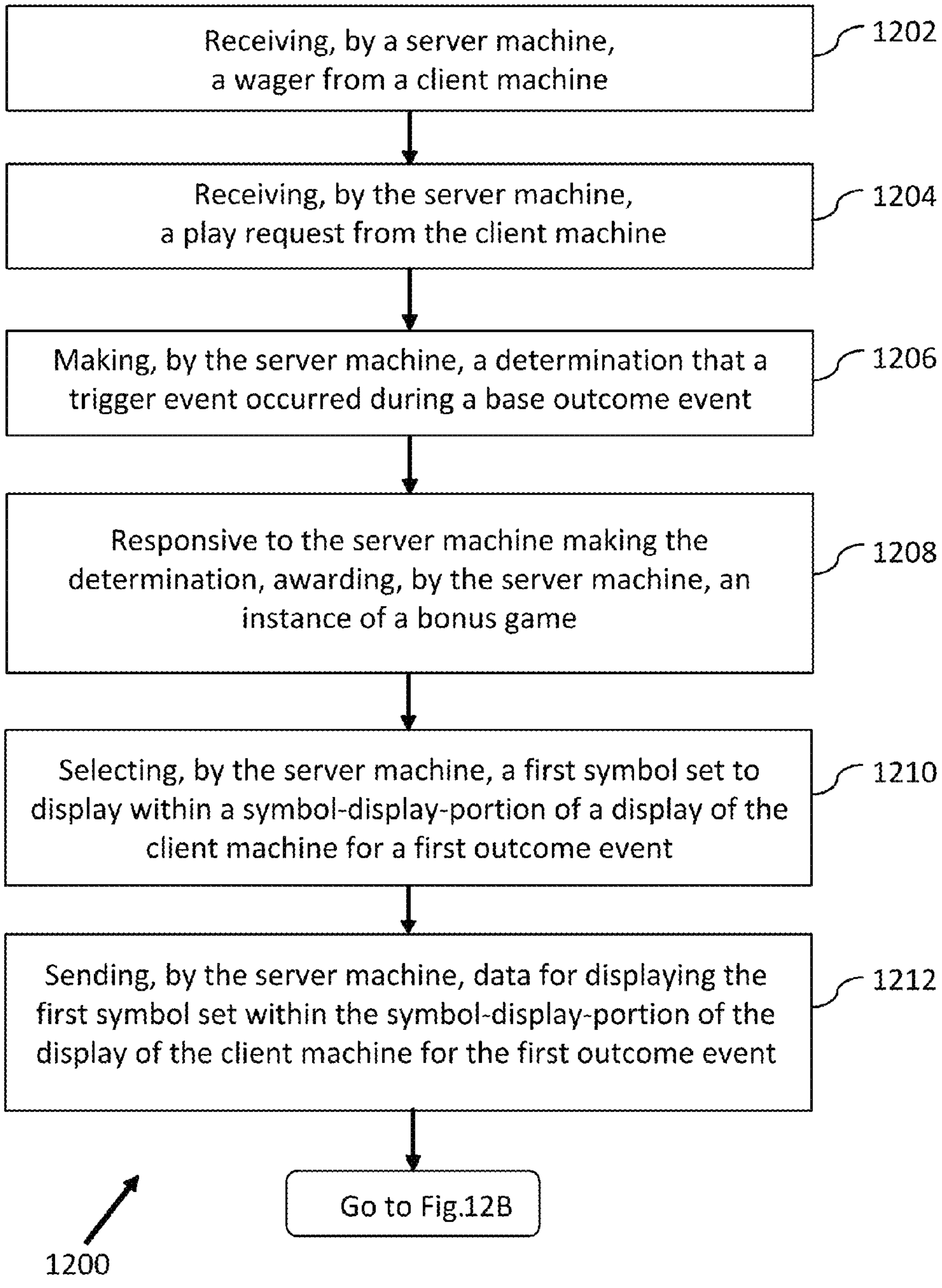
FIG. 12A is a first part of a flow chart, in accordance with example embodiments.

Turning to FIG. 12A, block 1202 includes receiving, by the server machine 100*a*, a wager from the client machine 100*b*.

Next, block 1204 includes receiving, by the server machine 110*a*, a play request from the client machine 100*b*.

Next, block 1206 includes making, by the server machine 110*a*, a determination that a trigger event occurred during a base outcome event.

Next, block 1208 includes awarding, by the server machine 110*a*, an instance of a bonus game.

Next, block 1210 includes selecting, by the server machine 100*a*, a first symbol set to display within the symbol-display-portion of the display 110*b* of the client machine 100*b* for a first outcome event.

Next, block 1212 includes sending, by the server machine 100*a*, data for displaying the first symbol set within the symbol-display-portion of the display 110*b* of the client device 100*b* for the first outcome event.

Figure 12B:
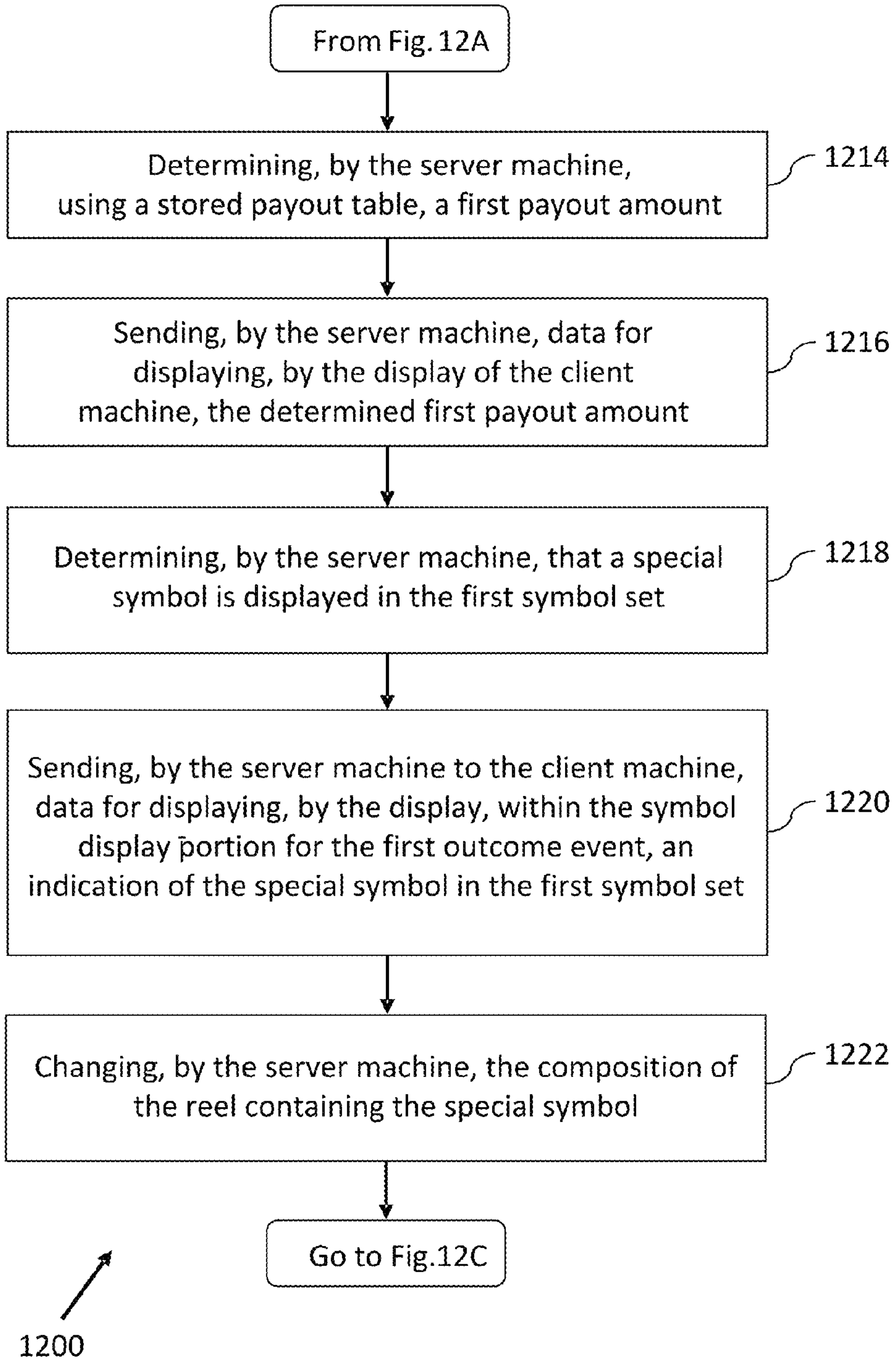
FIG. 12B is a second part of the flow chart of FIG. 12A, in accordance with example embodiments.

Turning to FIG. 12B, block 1214 includes determining, by the server machine 100*a* using a stored payout table, a first payout amount.

Next, block 1216 includes sending, by the server machine 100*a*, data for displaying, by the display 110*b* of the client machine 100*b*, the determined first payout amount.

Next, block 1218 includes determining, by the server machine 100*a*, that a special symbol is displayed in the first symbol set.

Next, block 1220 includes sending, by the server machine 100*a*, data for displaying, by the display 110*b* of the client machine 100*b*, within the symbol display portion for the first outcome event, an indication of the special symbol in the first symbol set.

Next, block 1222 includes changing, by the server machine 100*a*, the composition of the reel containing the special symbol.

Figure 12C:
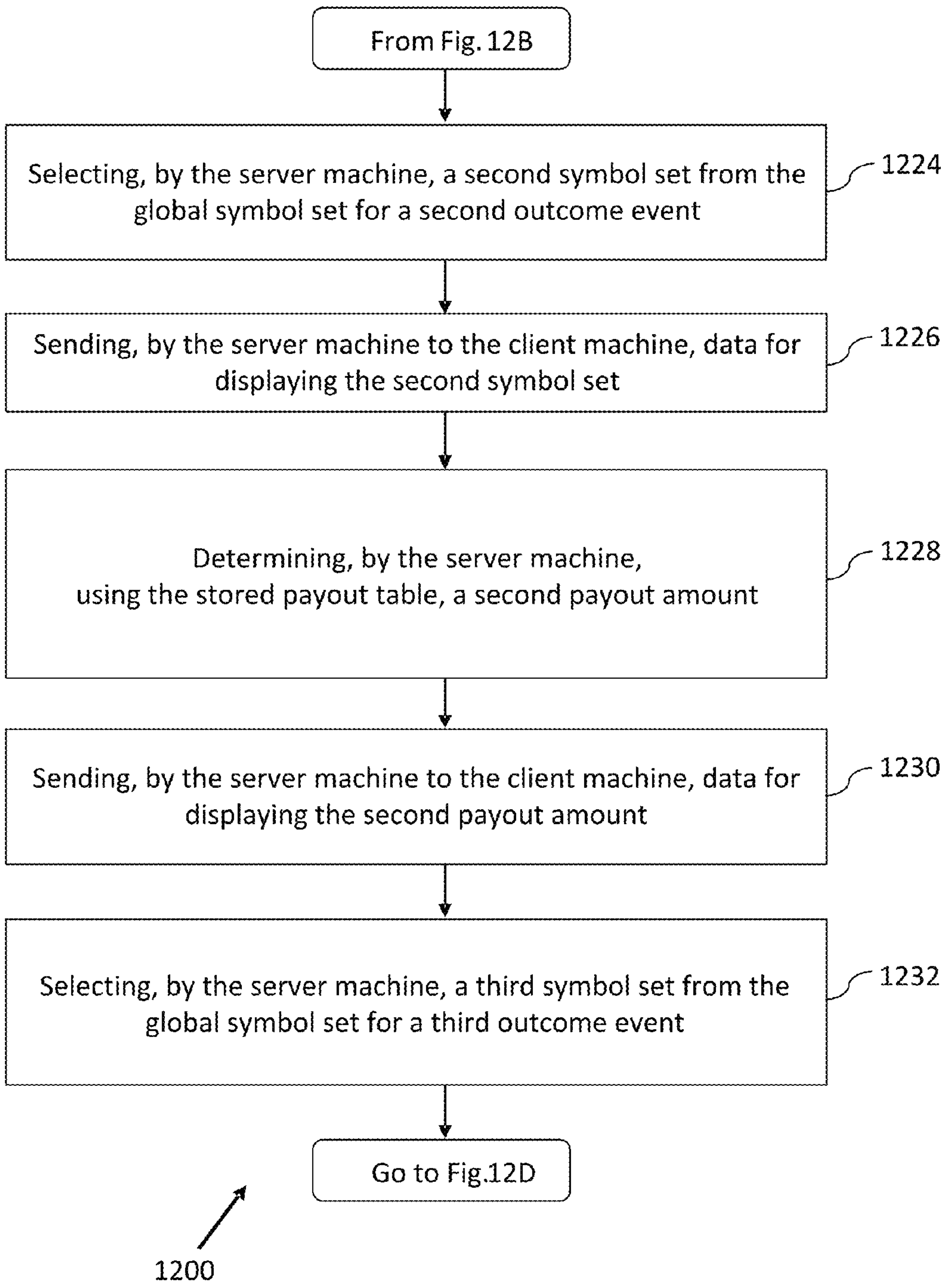
FIG. 12C is a third part of the flow chart of FIG. 12A, in accordance with example embodiments.

Turning to FIG. 12C, block 1224 includes selecting, by the server machine 100*a*, a second symbol set from the global symbol set for a second outcome event.

Next, block 1226 includes sending, by the server machine 100*a* to the client machine 100*b*, data for displaying the second symbol set.

Next, block 1228 includes determining, by the server machine 100*a*, using the stored payout table, a second payout amount.

Next, block 1230 includes sending, by the server machine 100*a*, data for displaying the second payout amount.

Next, block 1232 includes selecting, by the server machine 100*a*, a third symbol set from the global symbol set for a third outcome event.

Figure 12D:
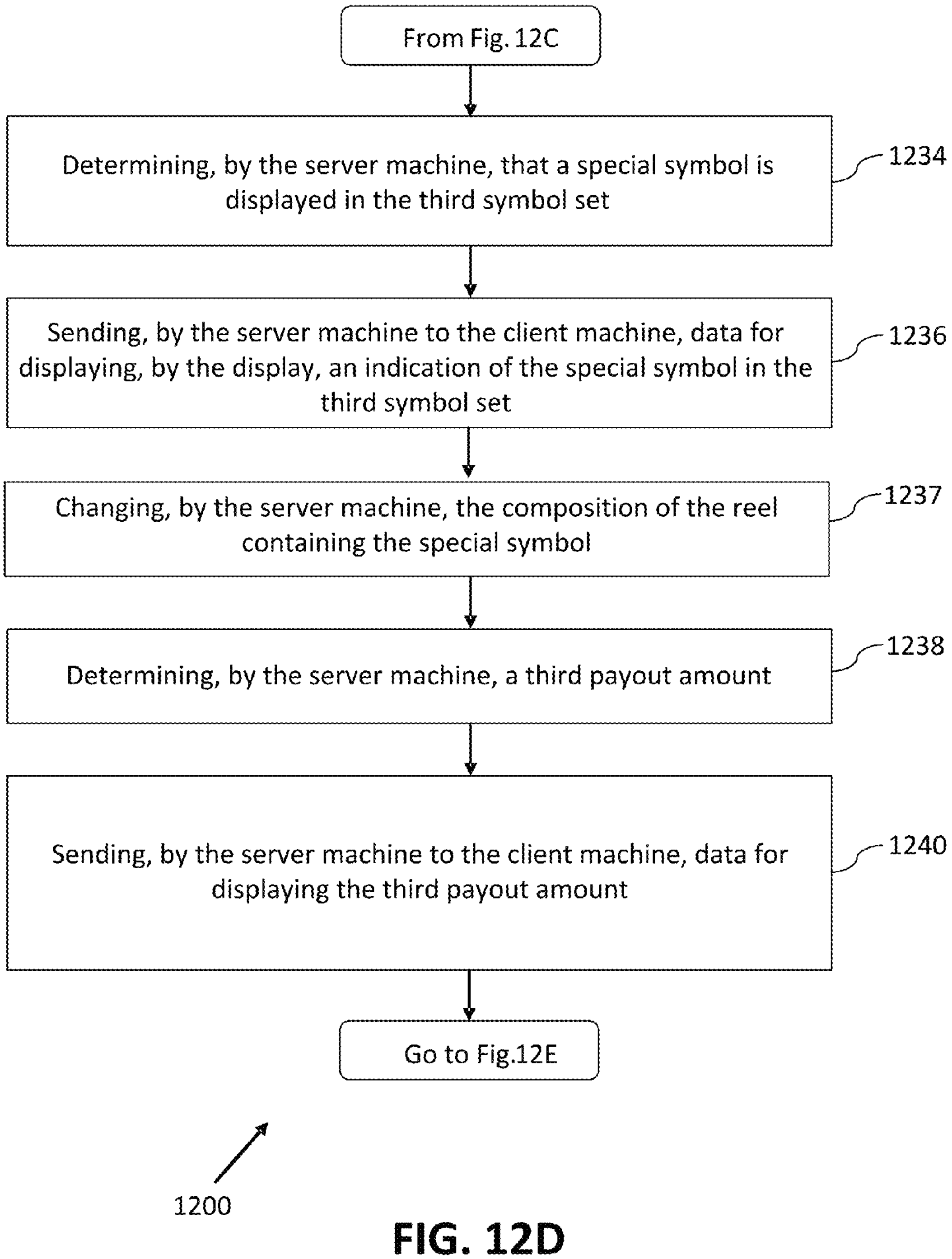
FIG. 12D is a fourth part of the flow chart of FIG. 12A, in accordance with example embodiments.

Turning to FIG. 12D, block 1234 includes determining, by the server machine 100*a*, that a special symbol is displayed in the third symbol set.

Next, block 1236 includes sending, by the server machine 100*a*, data for displaying, by display 110*b* of the client machine 100*b*, an indication of the special symbol in the third symbol set.

Next, block 1237 includes changing, by the server machine 100*a*, the composition of the reel containing the special symbol.

Next, block 1238 includes determining, by the server machine 100*a*, a third payout amount.

Next, block 1240 includes sending, by the server machine 100*a*, data for displaying, by the display 110*b* of the client machine 100*b*, the third payout amount.

Figure 12E:
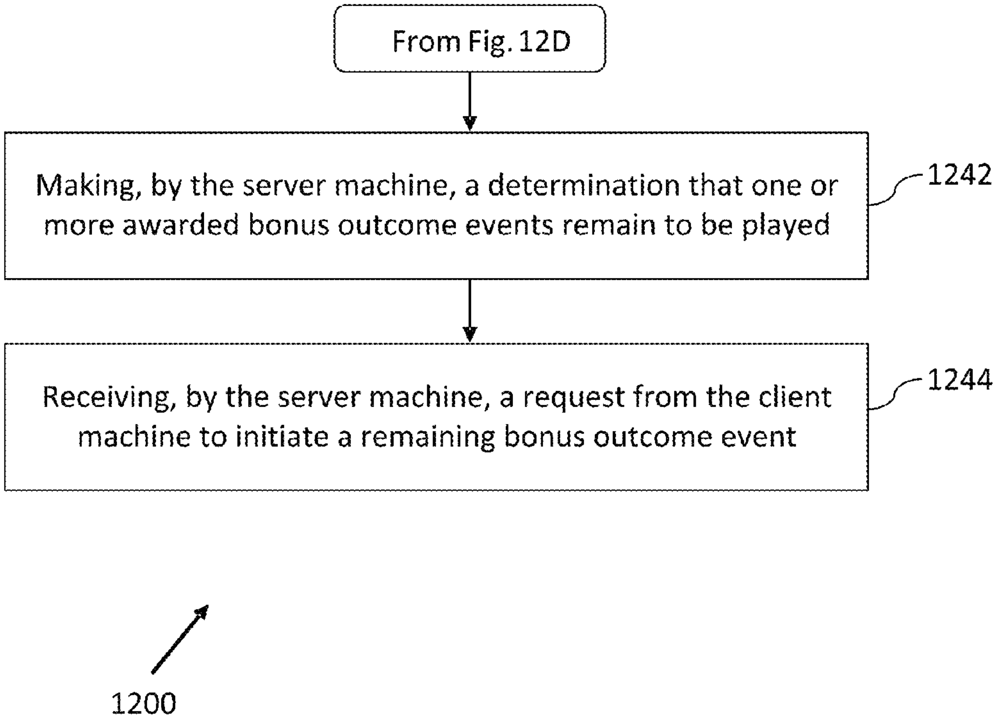
FIG. 12E is a fifth part of the flow chart of FIG. 12A, in accordance with example embodiments.

Turning to FIG. 12E, block 1242 includes making, by the server machine 100*a*, a determination that one or more awarded bonus outcome events remain to be played.

Next, block 1244 includes receiving, by the server machine 100*a*, a request from the client device 100*b* to initiate a remaining bonus outcome event.

FIG. 13A-13D depict a flowchart showing a set of operations 1300 (or more simply, "the set 1300") that can, for example, be carried out using client machine 100*b*. Note that several of the operations described in connection with FIG. 13A-13D parallel operations described in connection with FIG. 3A-3D and FIG. 12A-12E. As such, variations of the operations described in connection with FIG. 3A-3D and FIG. 12A-12E are likewise applicable to the operations described in connection with Figures FIG. 13A-13D. However, for the sake of brevity, these variations are not repeated. The client machine 100*b*, in performing the set 1300, can perform the operations described above with respect to machine 100.

Figure 13A:
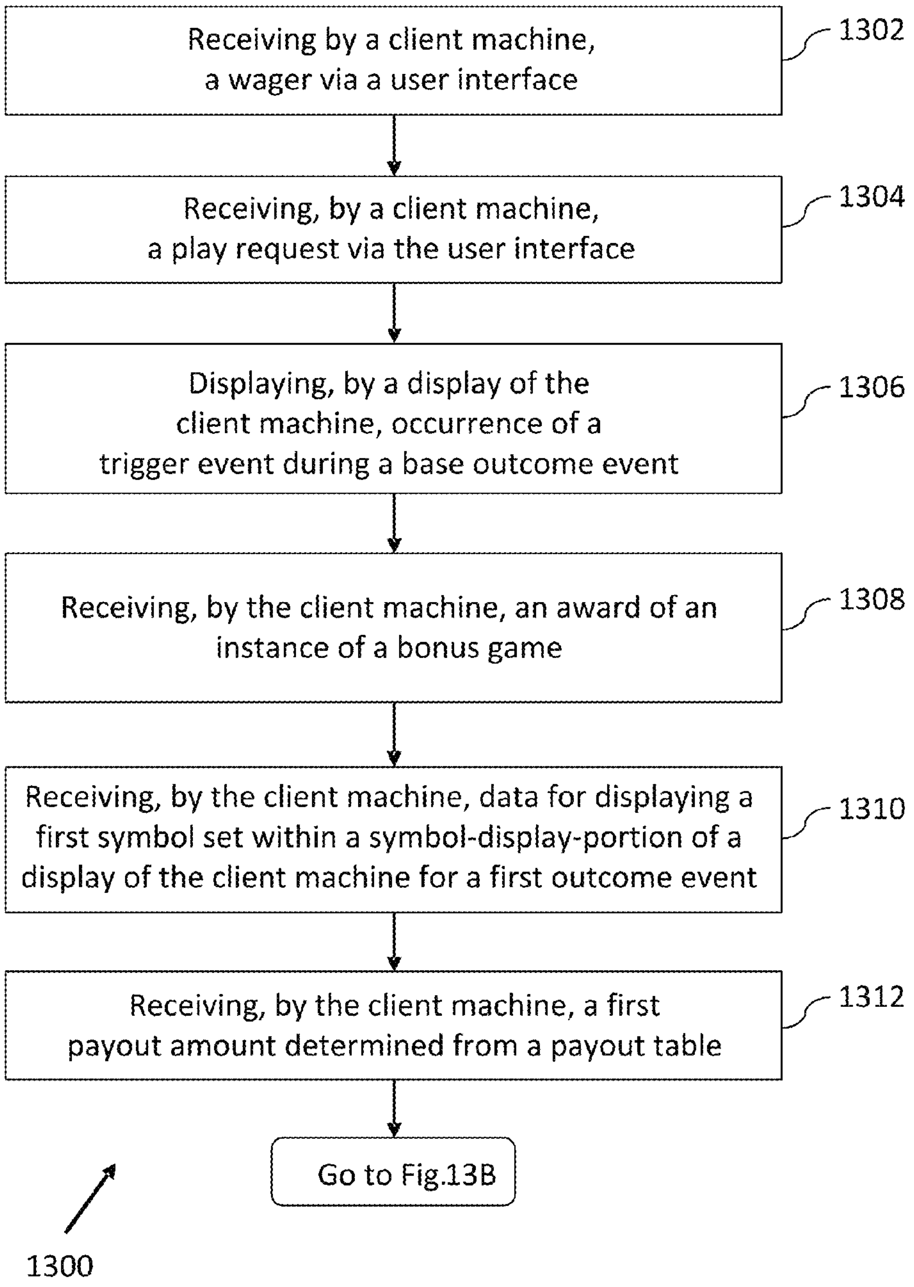
FIG. 13A is a first part of a flow chart, in accordance with example embodiments.

Turning to FIG. 13A, block 1302 includes receiving, by the client machine 100*b*, a wager via the user interface 104*b*. Client machine 100*b* can transmit the received wager or data indicative thereof over the communication network 116 to server machine 100*a*.

Next, block 1304 includes receiving, by the client machine 100*b*, a play request via the user interface 104*b*. Client machine 100*b* can transmit the received play request or data indicative thereof over the communication network 116 to server machine 100*a*.

Next, block 1306 includes displaying, by a display 110*b* of the client machine 100*b*, occurrence of a trigger event during a base outcome event.

Next, block 1308 includes receiving, by the client machine 100*b*, an award of an instance of a bonus game.

Next, block 1310 includes receiving, by the client machine 100*b*, data for displaying a first symbol set within the symbol-display-portion of the display 110*b* for a first outcome event.

Next, block 1312 includes receiving, by the client machine 110*b*, a first payout amount determined from a payout table.

Figure 13B:
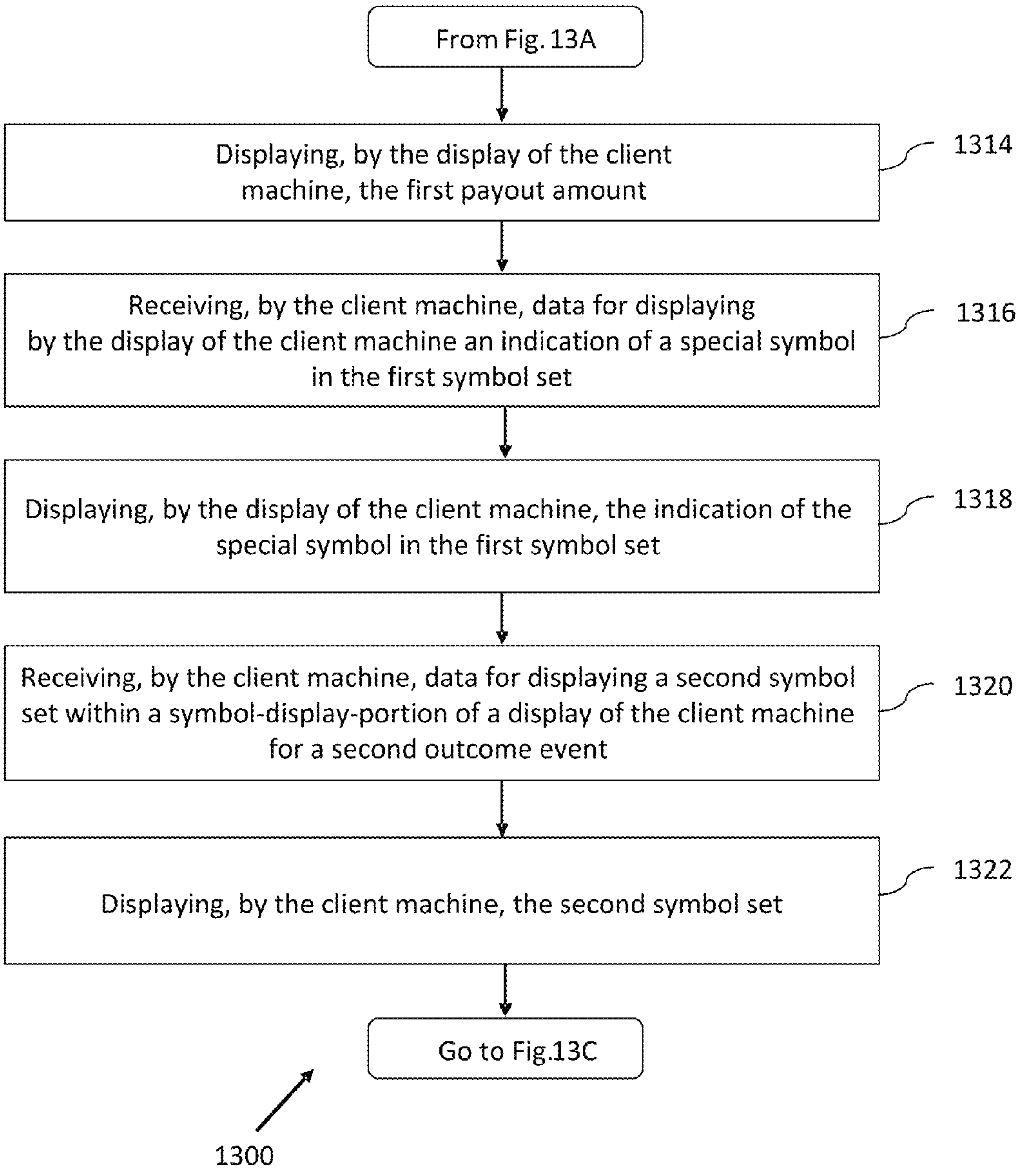
FIG. 13B is a second part of the flow chart of FIG. 13A, in accordance with example embodiments.

Turning to FIG. 13B, block 1314 includes displaying, by the display 110*b* of the client machine 100*b*, the determined first payout amount.

Next, block 1316 includes receiving, by the client machine 100*b*, data for displaying an indication of a special symbol in the first symbol set.

Next, block 1318 includes displaying, by the client machine 100*b*, the indication of a special symbol in the first symbol set.

Next, block 1320 includes receiving, by the client machine 100*b*, data for displaying a second symbol set within a symbol-display-portion of a display of the client machine 100*b* for a second outcome event.

Next, block 1322 includes displaying, by the client machine 100*b*, the second symbol set.

Figure 13C:
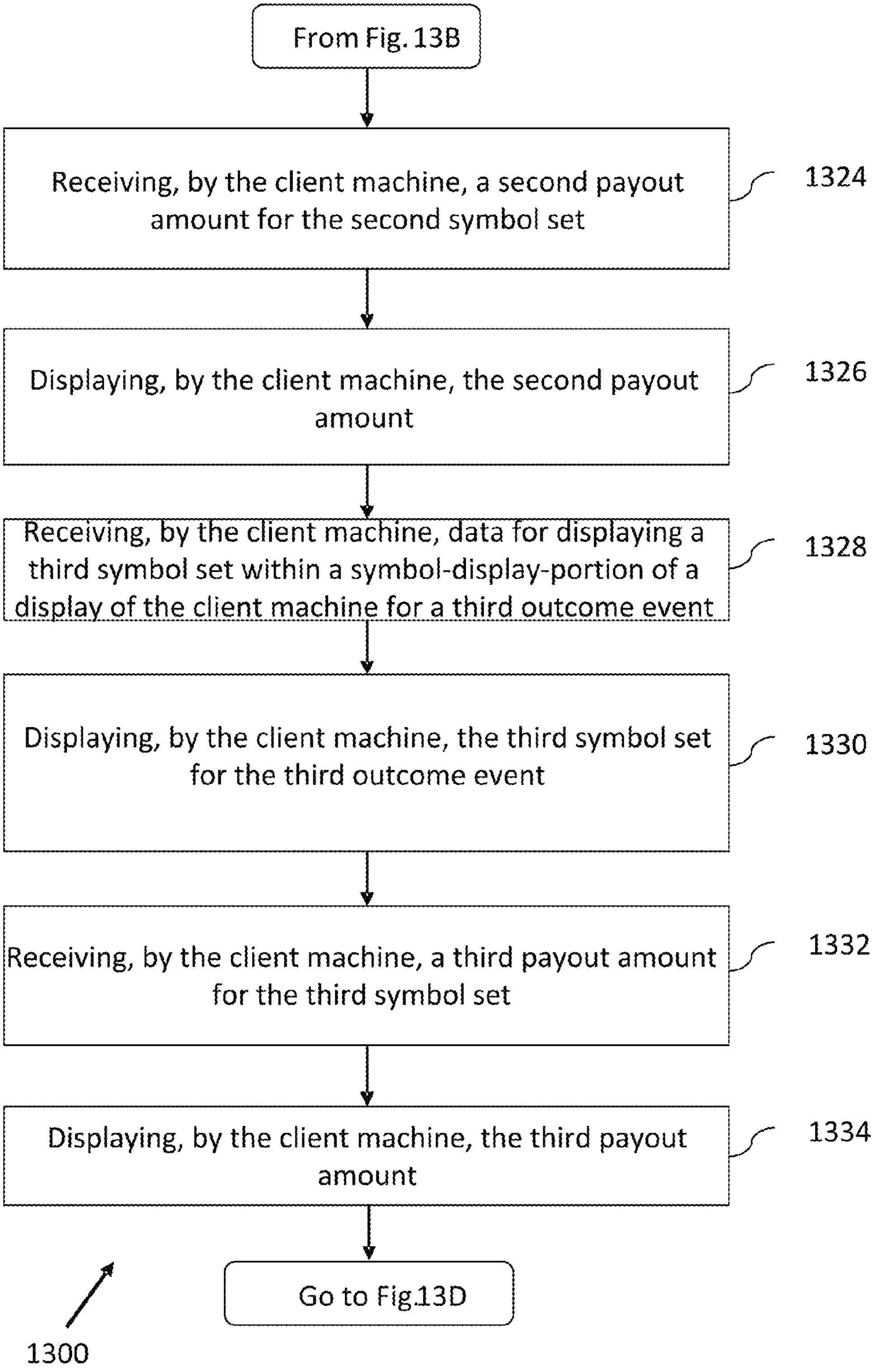
FIG. 13C is a third part of the flow chart of FIG. 13A, in accordance with example embodiments.

Turning to FIG. 13C, block 1324 includes receiving, by the client machine 100*b*, a second payout amount for the second symbol set.

Next, block 1326 includes displaying, by the client machine 100*b*, the second payout amount.

Next, block 1328 includes receiving, by the client machine 100*b*, data for displaying a third symbol set within a symbol-display-portion of a display of the client machine 100*b* for a third outcome event.

Next, block 1330 includes displaying, by the client machine 100*b*, the third symbol set for the third outcome event.

Next, block 1332 includes receiving, by the client machine 100*b*, a third payout amount for the third symbol set.

Next, block 1334 includes displaying, by the client machine 100*b*, the third payout amount.

Figure 13D:
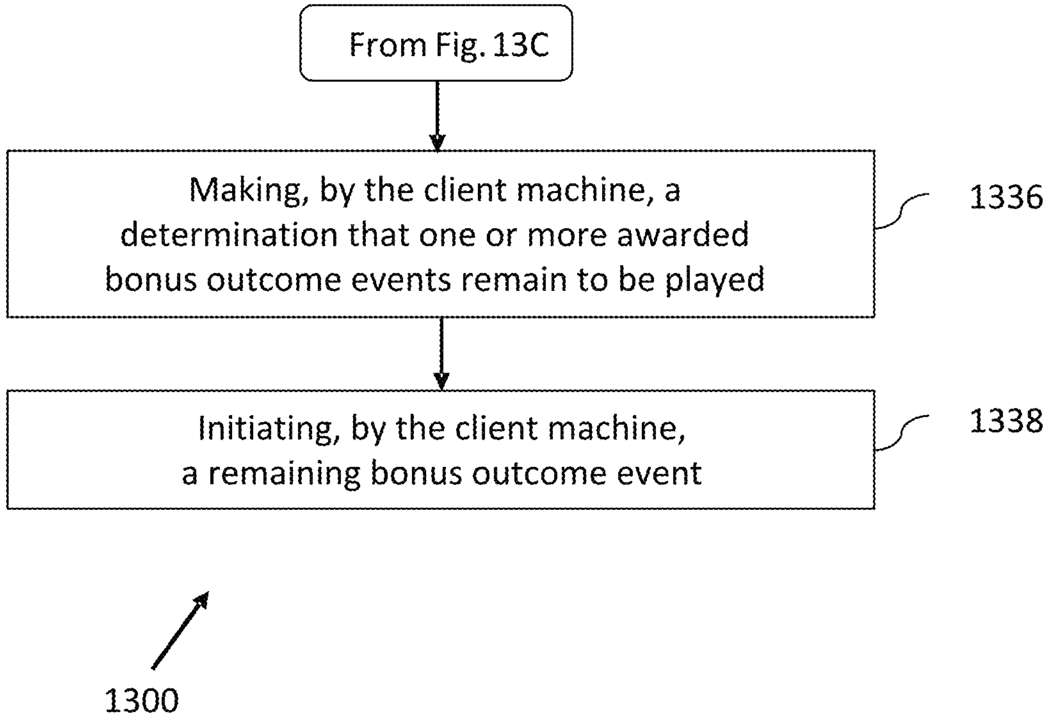
FIG. 13D is a fourth part of the flow chart of FIG. 13A, in accordance with example embodiments.

Turning to FIG. 13D, block 1336 includes making, by the client machine 100*b*, a determination that one or more awarded bonus outcome events remain to be played.

Next, block 1338 includes initiating, by the client machine, a remaining bonus outcome event.

Figure 14:
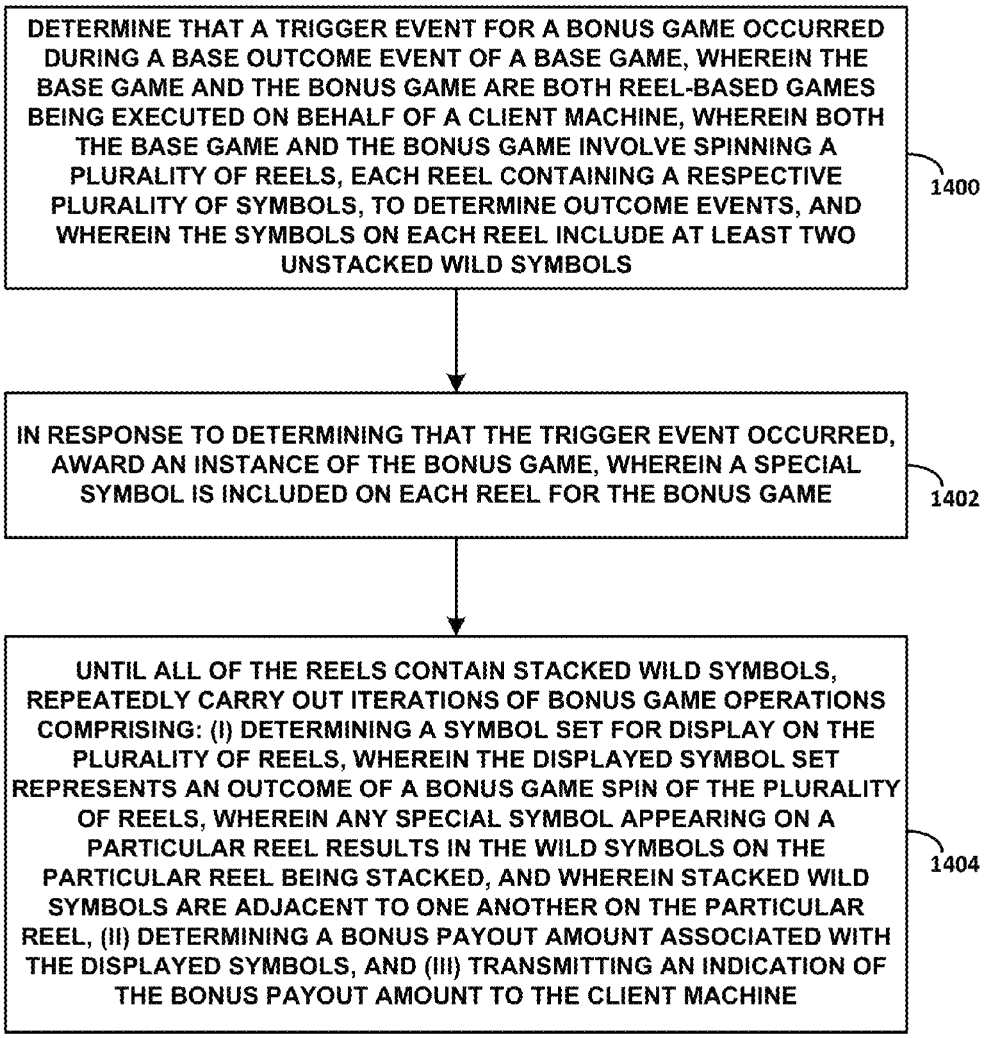
FIG. 14 is another flow chart, in accordance with example embodiments.
Figure 15:
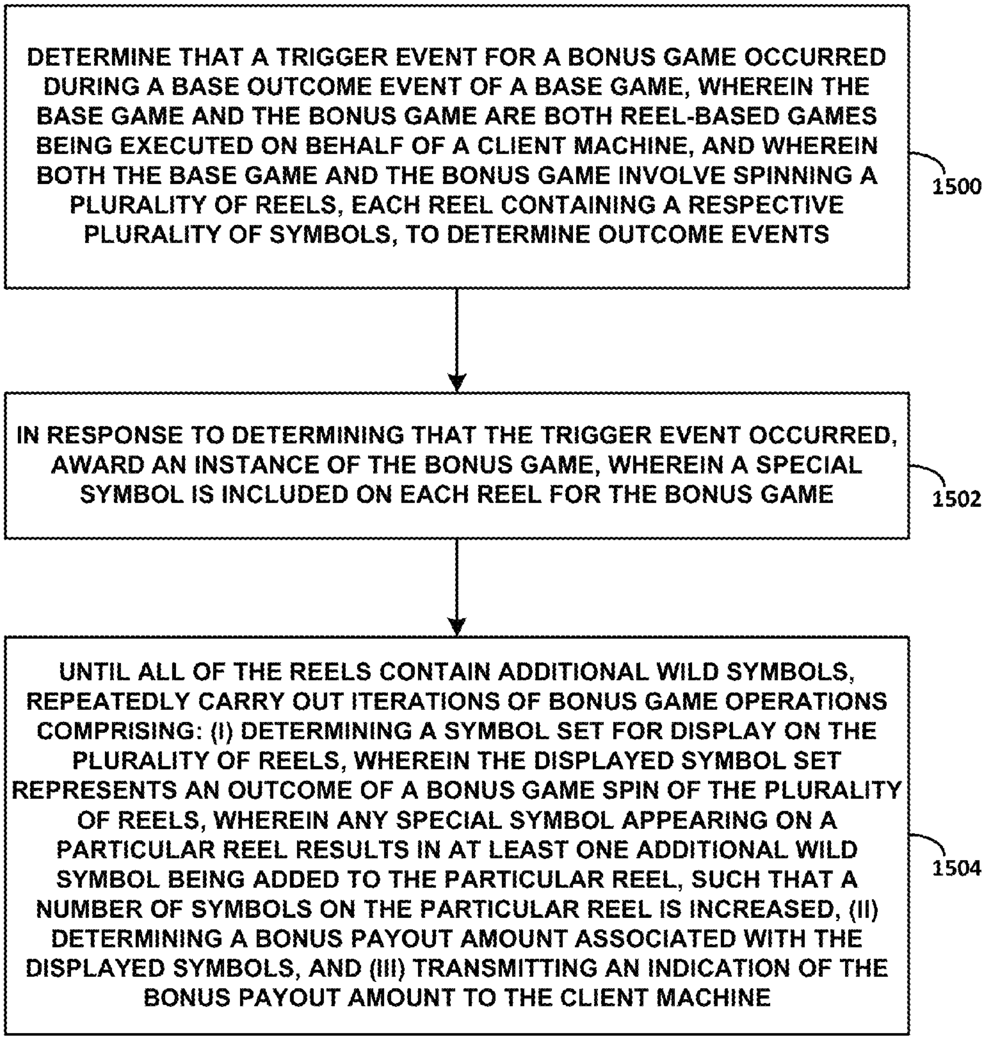
FIG. 15 is yet another flow chart, in accordance with example embodiments.

FIG. 14-15 depict respective flowcharts showing operations that can, for example, be carried out using server machine 100*a*. However, certain aspects of FIG. 14-15 could be carried out by client machine 100*b*. Also, several of the operations described in connection with FIG. 14-15 parallel operations described in connection with FIG. 3A-3D, FIG. 12A-12E, and/or FIG. 13A-13D. As such, variations of the operations described in connection with FIG. 3A-3D, FIG. 12A-12E, and/or FIG. 13A-13D are likewise applicable to the operations described in connection with FIG. 14-15. However, for the sake of brevity, these variations are not repeated.

At block 1400, it may be determined that a trigger event for a bonus game occurred during a base outcome event of a base game. The base game and the bonus game may both be reel-based games being executed on behalf of a client machine. Both the base game and the bonus game may involve spinning a plurality of reels, each reel containing a respective plurality of symbols, to determine outcome events. The symbols on each reel may include at least two unstacked wild symbols. In some embodiments, the trigger event may involve at least three instances of a triggering symbol appearing in a horizontal row across the reels.

At block 1402, possibly in response to determining that the trigger event occurred, an instance of the bonus game may be awarded. A special symbol may be included on each reel for the bonus game.

At block 1404, until all of the reels contain stacked wild symbols, iterations of bonus game operations may be repeatedly carried out, the operations including: (i) determining a symbol set for display on the plurality of reels, where the displayed symbol set represents an outcome of a bonus game spin of the plurality of reels, where any special symbol appearing on a particular reel results in the wild symbols on the particular reel being stacked, and where stacked wild symbols are placed adjacent to one another on the particular reel, (ii) determining a bonus payout amount associated with the displayed symbols, and (iii) transmitting an indication of the bonus payout amount to the client machine. In some embodiments, the bonus payout amount is based on a number of wild symbols displayed on the plurality of reels.

In some embodiments, the bonus game operations may involve transmitting, to the client machine, a representation of one or more of the determined symbol sets, wherein reception of each transmitted symbol set causes the client machine to display a spin of the reels resulting in the transmitted symbol set.

In some embodiments, each reel may include a respective cyclical sequence of symbols. Determining the symbol set for display on the plurality of reels may involve, for each reel, randomly selecting a respective reel position that displays a subsequence of the symbols on the reel. Determining the symbol set for display on the plurality of reels may involve simulating a spin of all reels.

In some embodiments, any special symbol being displayed on a particular reel may also result in the special symbol being removed from the particular reel. The special symbol may span two or three vertical symbol positions. Any special symbol appearing on the particular reel may result in at least two additional wild symbols being added to the particular reel. The at least two additional wild symbols may be stacked with the wild symbols already present on the particular reel.

In some embodiments, both the base game and the bonus game have five reels and each of the five reels displays three symbols at a time. The bonus game may be associated with a maximum number of bonus game spins of the reels, and the gaming machine may terminate the iterations of the bonus game operations when the maximum number of bonus game spins of the reels is reached.

In some embodiments, the client machine is associated with a credit account. The credit account may be debited to play the base game, credited in response to the triggering event, and/or credited by the bonus payout amount.

In some embodiments, a gaming machine (e.g., server machine 100*a*) may simultaneously execute base games and/or bonus games in real time on behalf of at least 30 client machines. Each of the at least 30 client machines may communicate with the gaming machine by way of a wide-area packet-switched network. In some cases, the gaming machine may simultaneously execute base games and/or bonus games in real time on behalf of more or fewer than 30 client machines. For instance, this simultaneous execution may involve 10, 20, 50, 100, or 1000 client machines, or another extent of client machines.

Particularly, simultaneous execution of such a large number of base games and/or bonus games in real time necessitates computer implementation. When taking part in an online game, such as the reel-based games disclosed herein, players expect results of reel spin, symbol addition, or symbol replacement operations to be displayed on their respective client machines in an expeditious fashion (e.g., in real time, such as a few seconds at most per either of these operations). Failure to do so may result in players becoming disinterested in the game. Consequently, the embodiments that include this simultaneous execution a large number of base games and/or bonus games in real time would not exist but for computer implementation thereof.

Further, the embodiments herein specify how interactions between a gaming machine and client machine are manipulated to yield a new result. This result provides a series of bonus game iterations that to players, so that players have further opportunities, and are further incentivized, to interact with the base game. Thus, the intersection of the new features of these embodiments and the computer implementation thereof go beyond conventional and routine operations.

Turning to FIG. 15, at block 1500 it may be determined that a trigger event for a bonus game occurred during a base outcome event of a base game. The base game and the bonus game may both be reel-based games being executed on behalf of a client machine. Both the base game and the bonus game may involve spinning a plurality of reels, each reel containing a respective plurality of symbols, to determine outcome events.

At block 1502, possibly in response to determining that the trigger event occurred, an instance of the bonus game may be awarded. A special symbol may be included on each reel for the bonus game.

At block 1504, until all of the reels contain additional wild symbols, iterations of bonus game operations may be repeatedly carried out, the operations including: (i) determining a symbol set for display on the plurality of reels, where the displayed symbol set represents an outcome of a bonus game spin of the plurality of reels, where any special symbol appearing on a particular reel results in at least one additional wild symbol being added to the particular reel, such that a number of symbols on the particular reel is increased, (ii) determining a bonus payout amount associated with the displayed symbols, and (iii) transmitting an indication of the bonus payout amount to the client machine.

In some embodiments, any special symbol appearing on a particular reel results in the wild symbols on the particular reel being stacked. Stacked wild symbols may be placed adjacent to one another on the particular reel.

In some embodiments, the operations in FIGS. 14 and/or 15 may be performed by a gaming system. The gaming system may involve a plurality of gaming devices, each including at least one display device and a plurality of input devices. The input devices may include (i) an acceptor of a physical item associated with a monetary value, (ii) a validator configured to identify the physical item, and (iii) a cash-out button actuatable to cause an initiation of a payout associated with a credit account.

As an example, each gaming device may additionally include one or more gaming device processors, and one or more gaming device memory devices storing a plurality of gaming device instructions executable by the one or more gaming device processors to: determine that a trigger event for a bonus game occurred during a base outcome event of a base game, wherein the base game and the bonus game are both reel-based games being executed on behalf of a particular gaming device, where both the base game and the bonus game involve spinning a plurality of reels, each reel containing a respective plurality of symbols, to determine outcome events, and where the symbols on each reel include at least two unstacked wild symbols; in response to determining that the trigger event occurred, award an instance of the bonus game, where a special symbol is included on each reel for the bonus game; and until all of the reels contain stacked wild symbols, repeatedly carry out iterations of bonus game operations comprising: (i) determining a symbol set for display on the plurality of reels, wherein the displayed symbol set represents an outcome of a bonus game spin of the plurality of reels, where any special symbol appearing on a particular reel results in the wild symbols on the particular reel being stacked, and where stacked wild symbols are adjacent to one another on the particular reel, (ii) determining a bonus payout amount associated with the displayed symbols, and (iii) crediting the respective bonus payout amount to the credit account.

V. Additional Example Embodiments

The following clauses are offered as further description of the disclosed embodiments.

(1) A method comprising:

determining, by a gaming machine, that a trigger event for a bonus game occurred during a base outcome event of a base game, wherein the base game and the bonus game are both reel-based games being executed on behalf of a client machine, wherein both the base game and the bonus game involve spinning a plurality of reels, each reel containing a respective plurality of symbols, to determine outcome events, and wherein the symbols on each reel include at least two unstacked wild symbols;

in response to determining that the trigger event occurred, awarding, by the gaming machine, an instance of the bonus game, wherein a special symbol is included on each reel for the bonus game; and until all of the reels contain stacked wild symbols, the gaming machine repeatedly carrying out iterations of bonus game operations comprising: (i) determining a symbol set for display on the plurality of reels, wherein the displayed symbol set represents an outcome of a bonus game spin of the plurality of reels, wherein any special symbol appearing on a particular reel results in the wild symbols on the particular reel being stacked, and wherein stacked wild symbols are placed adjacent to one another on the particular reel, (ii) determining a bonus payout amount associated with the displayed symbols, and (iii) transmitting an indication of the bonus payout amount to the client machine.

(2) The method of any preceding clause, wherein each reel comprises a respective cyclical sequence of symbols, and wherein determining the symbol set for display on the plurality of reels comprises:

for each reel, randomly selecting a respective reel position that displays a subsequence of the symbols on the reel.

(3) The method of any preceding clause, wherein determining the symbol set for display on the plurality of reels comprises simulating a spin of all reels.

(4) The method of any preceding clause, wherein the trigger event comprises at least three instances of a triggering symbol appearing in a horizontal row across the reels.

(5) The method of any preceding clause, wherein any special symbol being displayed on a particular reel also results in the special symbol being removed from the particular reel.

(6) The method of any preceding clause, wherein the special symbol spans two or three vertical symbol positions.

(7) The method of any preceding clause, wherein any special symbol appearing on the particular reel results in at least two additional wild symbols being added to the particular reel.

(8) The method of clause (7), wherein the at least two additional wild symbols are stacked with the wild symbols already present on the particular reel.

(9) The method of any preceding clause, wherein the bonus payout amount is based on a number of wild symbols displayed on the plurality of reels.

(10) The method of any preceding clause, wherein both the base game and the bonus game have five reels and each of the five reels displays three symbols at a time.

(11) The method of any preceding clause, wherein the bonus game is associated with a maximum number of bonus game spins of the reels, and wherein the gaming machine terminates the iterations of the bonus game operations when the maximum number of bonus game spins of the reels is reached.

(12) The method of any preceding clause, wherein the client machine is associated with a credit account, and wherein the credit account is debited to play the base game, credited in response to the triggering event, and credited by the bonus payout amount.

(13) The method of any preceding clause, wherein the gaming machine simultaneously executes base games or bonus games in real time on behalf of at least 30 client machines, and wherein each of the at least 30 client machines communicates with the gaming machine by way of a wide-area packet-switched network.

(13a) The method of any preceding clause, wherein the bonus game operations further comprise:

transmitting, to the client machine, a representation of one or more of the determined symbol sets, wherein reception of each transmitted symbol set causes the client machine to display a spin of the reels resulting in the transmitted symbol set.

(14) An article of manufacture including a non-transitory computer-readable medium, having stored thereon program instructions that, upon execution by a gaming machine, cause the gaming machine to perform operations comprising:

determining that a trigger event for a bonus game occurred during a base outcome event of a base game, wherein the base game and the bonus game are both reel-based games being executed on behalf of a client machine, wherein both the base game and the bonus game involve spinning a plurality of reels, each reel containing a respective plurality of symbols, to determine outcome events, and wherein the symbols on each reel include at least two unstacked wild symbols;

in response to determining that the trigger event occurred, awarding an instance of the bonus game, wherein a special symbol is included on each reel for the bonus game; and until all of the reels contain stacked wild symbols, repeatedly carrying out iterations of bonus game operations comprising: (i) determining a symbol set for display on the plurality of reels, wherein the displayed symbol set represents an outcome of a bonus game spin of the plurality of reels, wherein any special symbol appearing on a particular reel results in the wild symbols on the particular reel being stacked, and wherein stacked wild symbols are adjacent to one another on the particular reel, (ii) determining a bonus payout amount associated with the displayed symbols, and (iii) transmitting an indication of the bonus payout amount to the client machine.

(14a) The article of manufacture of clause (14) combined with aspects of any one or more of clauses (2)-(13a).

(15) The article of manufacture of clause (14), wherein any special symbol being displayed on a particular reel also results in the special symbol being removed from the particular reel.

(16) The article of manufacture of clause (14), wherein the special symbol spans two or three vertical symbol positions.

(17) The article of manufacture of clause (14), wherein any special symbol appearing on the particular reel results in at least two additional wild symbols being added to the particular reel.

(18) The article of manufacture of clause (14), wherein the at least two additional wild symbols are stacked with the wild symbols already present on the particular reel.

(19) A gaming system comprising:

a plurality of gaming devices each including at least one display device and a plurality of input devices including (i) an acceptor of a physical item associated with a monetary value, (ii) a validator configured to identify the physical item, and (iii) a cash-out button actuatable to cause an initiation of a payout associated with a credit account;

one or more gaming device processors; and one or more gaming device memory devices storing a plurality of gaming device instructions executable by the one or more gaming device processors to:

determine that a trigger event for a bonus game occurred during a base outcome event of a base game, wherein the base game and the bonus game are both reel-based games being executed on behalf of a particular gaming device, wherein both the base game and the bonus game involve spinning a plurality of reels, each reel containing a respective plurality of symbols, to determine outcome events, and wherein the symbols on each reel include at least two unstacked wild symbols;

in response to determining that the trigger event occurred, award an instance of the bonus game, wherein a special symbol is included on each reel for the bonus game; and until all of the reels contain stacked wild symbols, repeatedly carry out iterations of bonus game operations comprising: (i) determining a symbol set for display on the plurality of reels, wherein the displayed symbol set represents an outcome of a bonus game spin of the plurality of reels, wherein any special symbol appearing on a particular reel results in the wild symbols on the particular reel being stacked, and wherein stacked wild symbols are adjacent to one another on the particular reel, (ii) determining a bonus payout amount associated with the displayed symbols, and (iii) crediting the respective bonus payout amount to the credit account.

(19a) The gaming system of clause (19) combined with aspects of any one or more of clauses (2)-(13a).

(20) A method comprising:

determining, by a gaming machine, that a trigger event for a bonus game occurred during a base outcome event of a base game, wherein the base game and the bonus game are both reel-based games being executed on behalf of a client machine, and wherein both the base game and the bonus game involve spinning a plurality of reels, each reel containing a respective plurality of symbols, to determine outcome events;

in response to determining that the trigger event occurred, awarding, by the gaming machine, an instance of the bonus game, wherein a special symbol is included on each reel for the bonus game; and until all of the reels contain additional wild symbols, the gaming machine repeatedly carrying out iterations of bonus game operations comprising: (i) determining a symbol set for display on the plurality of reels, wherein the displayed symbol set represents an outcome of a bonus game spin of the plurality of reels, wherein any special symbol appearing on a particular reel results in at least one additional wild symbol being added to the particular reel, such that a number of symbols on the particular reel is increased, (ii) determining a bonus payout amount associated with the displayed symbols, and (iii) transmitting an indication of the bonus payout amount to the client machine.

(20a) The method of clause (20) combined with aspects of any one or more of clauses (2)-(13a).

(21) The method of clause (20), wherein any special symbol appearing on a particular reel results in the wild symbols on the particular reel being stacked, and wherein stacked wild symbols are placed adjacent to one another on the particular reel..

VI. Conclusion

While one or more disclosed operations have been described as being performed by certain entities (e.g., machine 100, server machine 100*a*, or client machine 100*b*), one or more of the operations may be performed by any entity, including but not limited to those described herein. As such, while this disclosure includes examples in which the server machine 100*a* performs select operations and sends data to the client machine 100*b*, such that the client machine 100*b* may perform complementing operations and receive the data, variations may to those operations may be made while adhering to the general server-client dichotomy and the scope of the disclosed machines and methods.

For example, rather than the server machine 100*a* sending select data (e.g., a symbol set) to the client machine 100*b*, such that the client machine may generate and display appropriate images, the server machine 100*a* may itself generate the images and send them to the client machine 100*b* for display. Indeed, it will be appreciated by one of ordinary skill in the art that the "break point" between the server machine's operations and the client machine's operations may be varied with ease.

Further, the described operations throughout this application need not be performed in the disclosed order, although in some examples, the recited order may be preferred. Also, not all operations need to be performed to achieve the desired advantages of disclosed machines and methods, and therefore not all operations are required.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While examples have been described in terms of select embodiments, alterations and permutations of these embodiments will be apparent to those of ordinary skill in the art. Other changes, substitutions, and alterations are also possible without departing from the disclosed machines and methods in their broader aspects as set forth in the following claims.

What is claimed is:

1. A method comprising:

determining, by a gaming machine, that a trigger event for a bonus game occurred during a base outcome event of a base game, wherein the base game and the bonus game are both reel-based games being executed on behalf of a client machine, wherein both the base game and the bonus game involve spinning a plurality of reels, each reel containing a respective plurality of symbols, to determine outcome events, and wherein the symbols on each reel include at least two unstacked wild symbols;

in response to determining that the trigger event occurred, awarding, by the gaming machine, an instance of the bonus game, wherein a special symbol is included on each reel for the bonus game; and until all of the reels contain stacked wild symbols, the gaming machine repeatedly carrying out iterations of bonus game operations comprising: (i) determining a symbol set for display on the plurality of reels, wherein the displayed symbol set represents an outcome of a bonus game spin of the plurality of reels, wherein any special symbol appearing on a particular reel results in the wild symbols on the particular reel being stacked, and wherein stacked wild symbols are placed adjacent to one another on the particular reel, (ii) determining a bonus payout amount associated with the displayed symbols, and (iii) transmitting an indication of the bonus payout amount to the client machine.

2. The method of claim 1, wherein each reel comprises a respective cyclical sequence of symbols, and wherein determining the symbol set for display on the plurality of reels comprises:

for each reel, randomly selecting a respective reel position that displays a subsequence of the symbols on the reel.

3. The method of claim 1, wherein determining the symbol set for display on the plurality of reels comprises simulating a spin of all reels.

4. The method of claim 1, wherein the trigger event comprises at least three instances of a triggering symbol appearing in a horizontal row across the reels.

5. The method of claim 1, wherein any special symbol being displayed on a particular reel also results in the special symbol being removed from the particular reel.

6. The method of claim 1, wherein the special symbol spans two or three vertical symbol positions.

7. The method of claim 1, wherein any special symbol appearing on the particular reel results in at least two additional wild symbols being added to the particular reel.

8. The method of claim 7, wherein the at least two additional wild symbols are stacked with the wild symbols already present on the particular reel.

9. The method of claim 1, wherein the bonus payout amount is based on a number of wild symbols displayed on the plurality of reels.

10. The method of claim 1, wherein both the base game and the bonus game have five reels and each of the five reels displays three symbols at a time.

11. The method of claim 1, wherein the bonus game is associated with a maximum number of bonus game spins of the reels, and wherein the gaming machine terminates the iterations of the bonus game operations when the maximum number of bonus game spins of the reels is reached.

12. The method of claim 1, wherein the client machine is associated with a credit account, and wherein the credit account is debited to play the base game, credited in response to the triggering event, and credited by the bonus payout amount.

13. The method of claim 1, wherein the gaming machine simultaneously executes base games or bonus games in real time on behalf of at least 30 client machines, and wherein each of the at least 30 client machines communicates with the gaming machine by way of a wide-area packet-switched network.

14. The method of claim 1, wherein the bonus game operations further comprise:

transmitting, to the client machine, a representation of one or more of the determined symbol sets, wherein reception of each transmitted symbol set causes the client machine to display a spin of the reels resulting in the transmitted symbol set.

15. An article of manufacture including a non-transitory computer-readable medium, having stored thereon program instructions that, upon execution by a gaming machine, cause the gaming machine to perform operations comprising:

determining that a trigger event for a bonus game occurred during a base outcome event of a base game, wherein the base game and the bonus game are both reel-based games being executed on behalf of a client machine, wherein both the base game and the bonus game involve spinning a plurality of reels, each reel containing a respective plurality of symbols, to determine outcome events, and wherein the symbols on each reel include at least two unstacked wild symbols;

in response to determining that the trigger event occurred, awarding an instance of the bonus game, wherein a special symbol is included on each reel for the bonus game; and until all of the reels contain stacked wild symbols, repeatedly carrying out iterations of bonus game operations comprising: (i) determining a symbol set for display on the plurality of reels, wherein the displayed symbol set represents an outcome of a bonus game spin of the plurality of reels, wherein any special symbol appearing on a particular reel results in the wild symbols on the particular reel being stacked, and wherein stacked wild symbols are adjacent to one another on the particular reel, (ii) determining a bonus payout amount associated with the displayed symbols, and (iii) transmitting an indication of the bonus payout amount to the client machine.

16. The article of manufacture of claim 15, wherein any special symbol being displayed on a particular reel also results in the special symbol being removed from the particular reel.

17. The article of manufacture of claim 15, wherein the special symbol spans two or three vertical symbol positions.

18. The article of manufacture of claim 15, wherein any special symbol appearing on the particular reel results in at least two additional wild symbols being added to the particular reel.

19. The article of manufacture of claim 18, wherein the at least two additional wild symbols are stacked with the wild symbols already present on the particular reel.

20. A gaming system comprising:

a plurality of gaming devices each including at least one display device and a plurality of input devices including (i) an acceptor of a physical item associated with a monetary value, (ii) a validator configured to identify the physical item, and (iii) a cash-out button actuatable to cause an initiation of a payout associated with a credit account;

one or more gaming device processors; and one or more gaming device memory devices storing a plurality of gaming device instructions executable by the one or more gaming device processors to:

determine that a trigger event for a bonus game occurred during a base outcome event of a base game, wherein the base game and the bonus game are both reel-based games being executed on behalf of a particular gaming device, wherein both the base game and the bonus game involve spinning a plurality of reels, each reel containing a respective plurality of symbols, to determine outcome events, and wherein the symbols on each reel include at least two unstacked wild symbols;

in response to determining that the trigger event occurred, award an instance of the bonus game, wherein a special symbol is included on each reel for the bonus game; and until all of the reels contain stacked wild symbols, repeatedly carry out iterations of bonus game operations comprising: (i) determining a symbol set for display on the plurality of reels, wherein the displayed symbol set represents an outcome of a bonus game spin of the plurality of reels, wherein any special symbol appearing on a particular reel results in the wild symbols on the particular reel being stacked, and wherein stacked wild symbols are adjacent to one another on the particular reel, (ii) determining a bonus payout amount associated with the displayed symbols, and (iii) crediting the respective bonus payout amount to the credit account.

* * * * *